(12) United States Patent
de Jong et al.

(10) Patent No.: US 10,782,485 B2
(45) Date of Patent: Sep. 22, 2020

(54) HARDENED FIBER OPTIC CONNECTORS HAVING A MECHANICAL SPLICE CONNECTOR ASSEMBLY

(71) Applicant: CORNING OPTICAL COMMUNICATIONS LLC, Hickory, NC (US)

(72) Inventors: Michael de Jong, Colleyville, TX (US); Wolf Peter Kluwe, Hagen (DE); Daniel Leyva, Jr., Arlington, TX (US); Min Tao, Shanghai (CN)

(73) Assignee: Corning Optical Communications LLC, Charlotte, NC (US)

(*) Notice: Subject to any disclaimer, the term of this patent is extended or adjusted under 35 U.S.C. 154(b) by 0 days.

(21) Appl. No.: 16/211,977

(22) Filed: Dec. 6, 2018

(65) Prior Publication Data

US 2019/0113690 A1    Apr. 18, 2019

Related U.S. Application Data

(63) Continuation of application No. PCT/US2017/013164, filed on Jan. 12, 2017.
(Continued)

(51) Int. Cl.
*G02B 6/38* (2006.01)
*G02B 6/44* (2006.01)

(52) U.S. Cl.
CPC ........... *G02B 6/3846* (2013.01); *G02B 6/381* (2013.01); *G02B 6/3806* (2013.01); *G02B 6/387* (2013.01);
(Continued)

(58) Field of Classification Search
USPC .......................................................... 385/81
See application file for complete search history.

(56) References Cited

U.S. PATENT DOCUMENTS 6,542,674 B1   4/2003  Gimblet
7,712,973 B2   5/2010  DiMarco
(Continued)

FOREIGN PATENT DOCUMENTS

WO      2011025637 A1    3/2011

OTHER PUBLICATIONS

International Search Report and Written Opinion PCT/US2017/013164, dated Apr. 2017 (Year: 2017).*
(Continued)

*Primary Examiner* — Eric Wong
(74) *Attorney, Agent, or Firm* — Michael E. Carroll, Jr.

(57) ABSTRACT

Hardened fiber optic connectors having a mechanical splice assembly are disclosed. The mechanical splice assembly is attached to a first end of an optical waveguide such as an optical fiber of a fiber optic cable by way of a stub optical fiber, thereby connectorizing the hardened connector. In one embodiment, the hardened connector includes an inner housing having two shells for securing a tensile element of the cable and securing the mechanical splice assembly so that a ferrule assembly may translate. Further assembly of the hardened connector has the inner housing fitting into a shroud of the hardened connector. The shroud aides in mating the hardened connector with a complimentary device and the shroud may have any suitable configuration. The hardened connector may also include features for fiber buckling, sealing, cable strain relief or a pre-assembly for ease of installation.

48 Claims, 41 Drawing Sheets

Related U.S. Application Data

(60) Provisional application No. 62/294,443, filed on Feb. 12, 2016, provisional application No. 62/277,659, filed on Jan. 12, 2016.

(52) U.S. Cl.
CPC ......... *G02B 6/3833* (2013.01); *G02B 6/3869* (2013.01); *G02B 6/3887* (2013.01); *G02B 6/443* (2013.01); *G02B 6/3823* (2013.01)

(56) References Cited

U.S. PATENT DOCUMENTS

| | | | |
|---|---|---|---|
| 7,881,576 | B2 | 2/2011 | Melton et al. |
| 10,073,224 | B2 | 9/2018 | Tong et al. |
| 10,288,821 | B2 | 5/2019 | Isenhour |
| 2001/0002220 | A1 | 5/2001 | Throckmorton et al. |
| 2005/0036744 | A1 | 2/2005 | Caveney et al. |
| 2008/0310797 | A1* | 12/2008 | Yazaki ................ G02B 6/3806 385/78 |
| 2010/0220959 | A1 | 9/2010 | Hoffmann et al. |
| 2012/0180298 | A1* | 7/2012 | Castonguay ......... G02B 6/3846 29/434 |
| 2015/0003790 | A1* | 1/2015 | Wu ...................... G02B 6/3887 385/81 |
| 2016/0187590 | A1 | 6/2016 | Lu |

OTHER PUBLICATIONS

Fukui et al; "Waterproof Optical Connector Having Compatibility to Various Optical Connection Interfaces" ; IWCS Proceedings 65th, 2016, p. 302-306.

International Search Report & Written Opinion dated Apr. 18, 2017 for International Patent Application No. PCT/US2017/013164 filed Jan. 12, 2017. pp. 1-12.

* cited by examiner

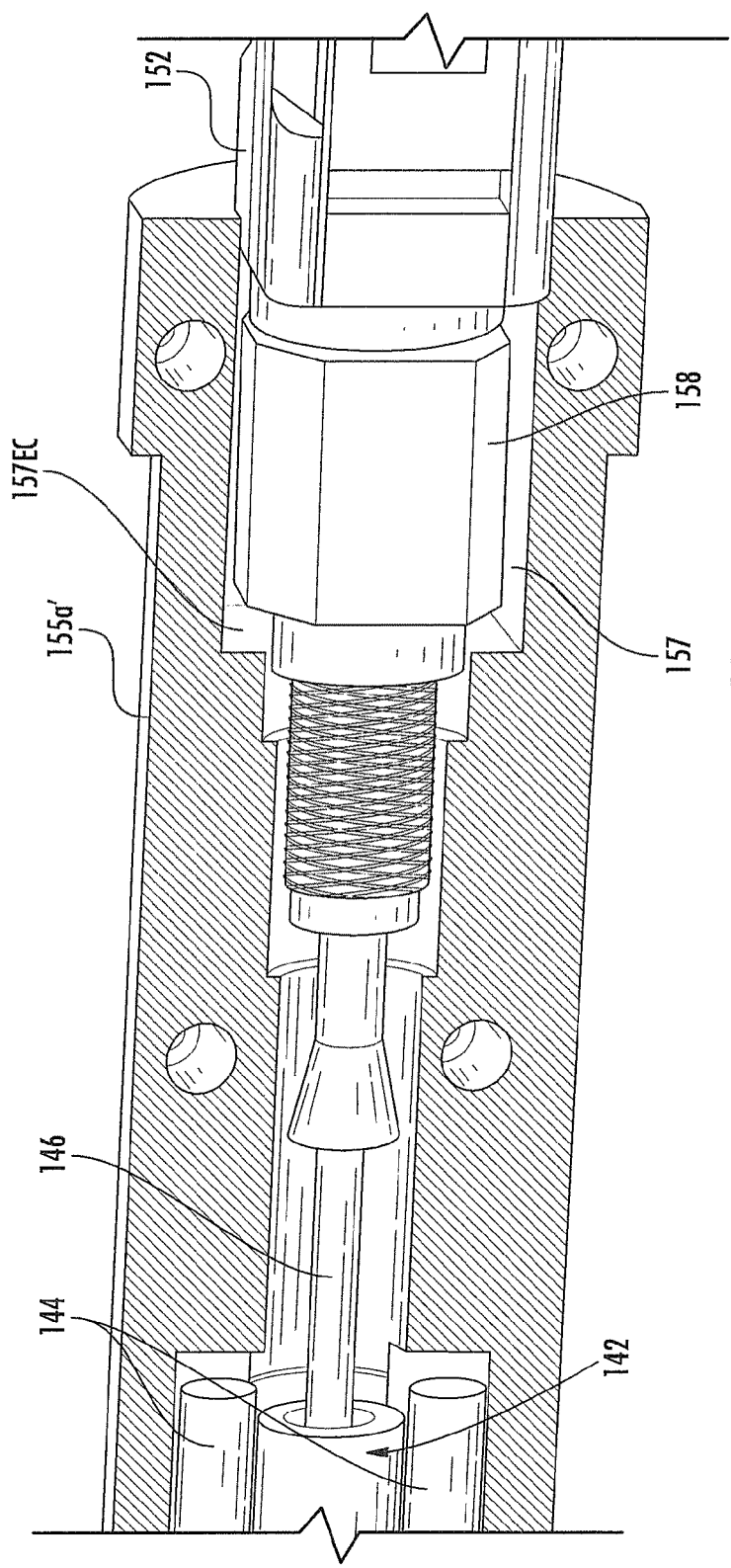

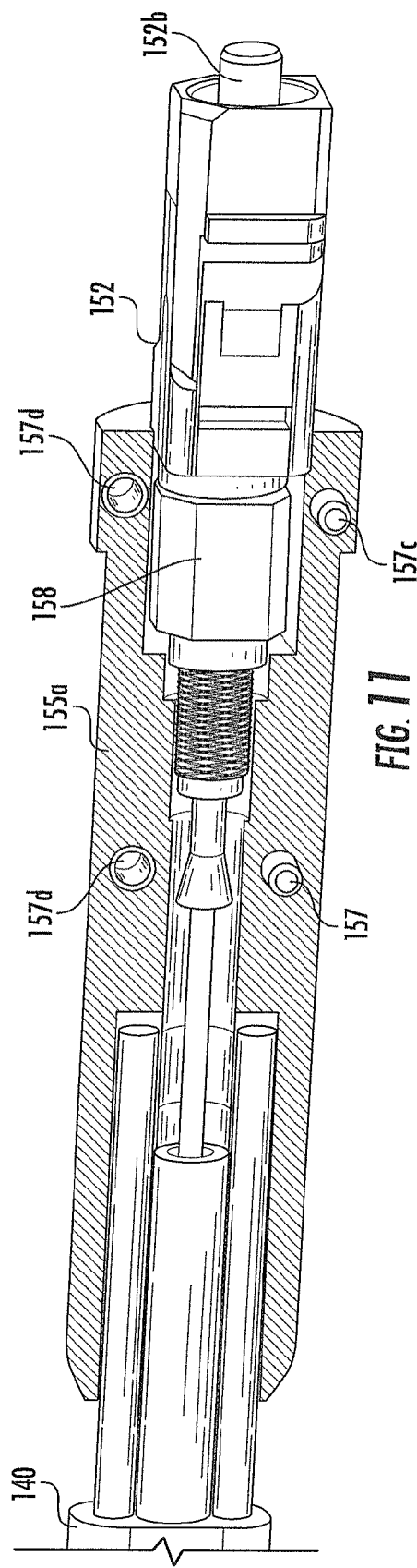
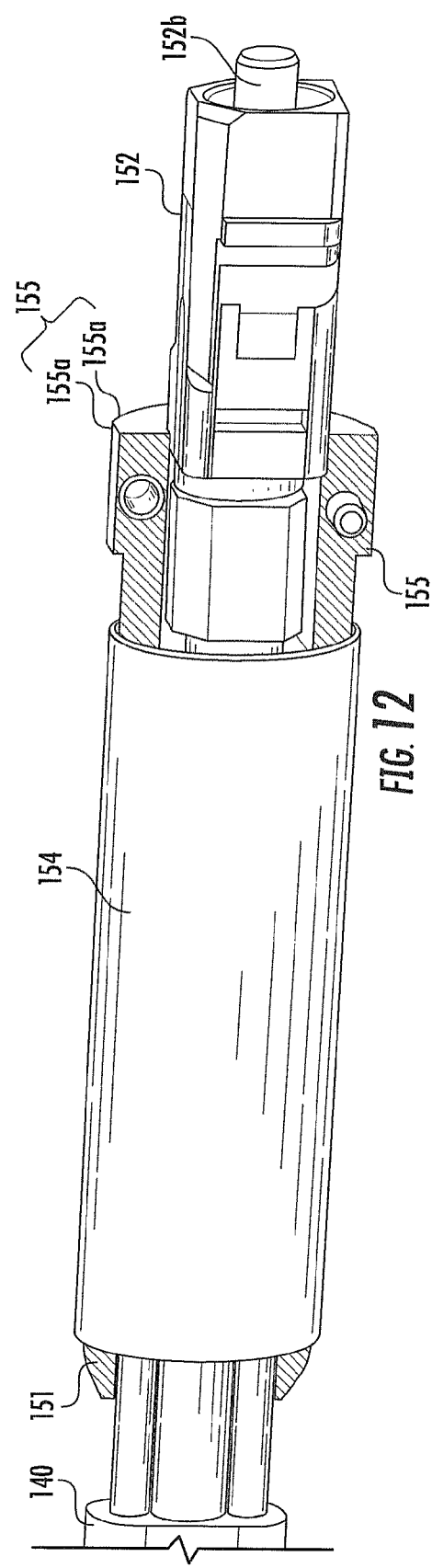
FIG. 11
FIG. 12

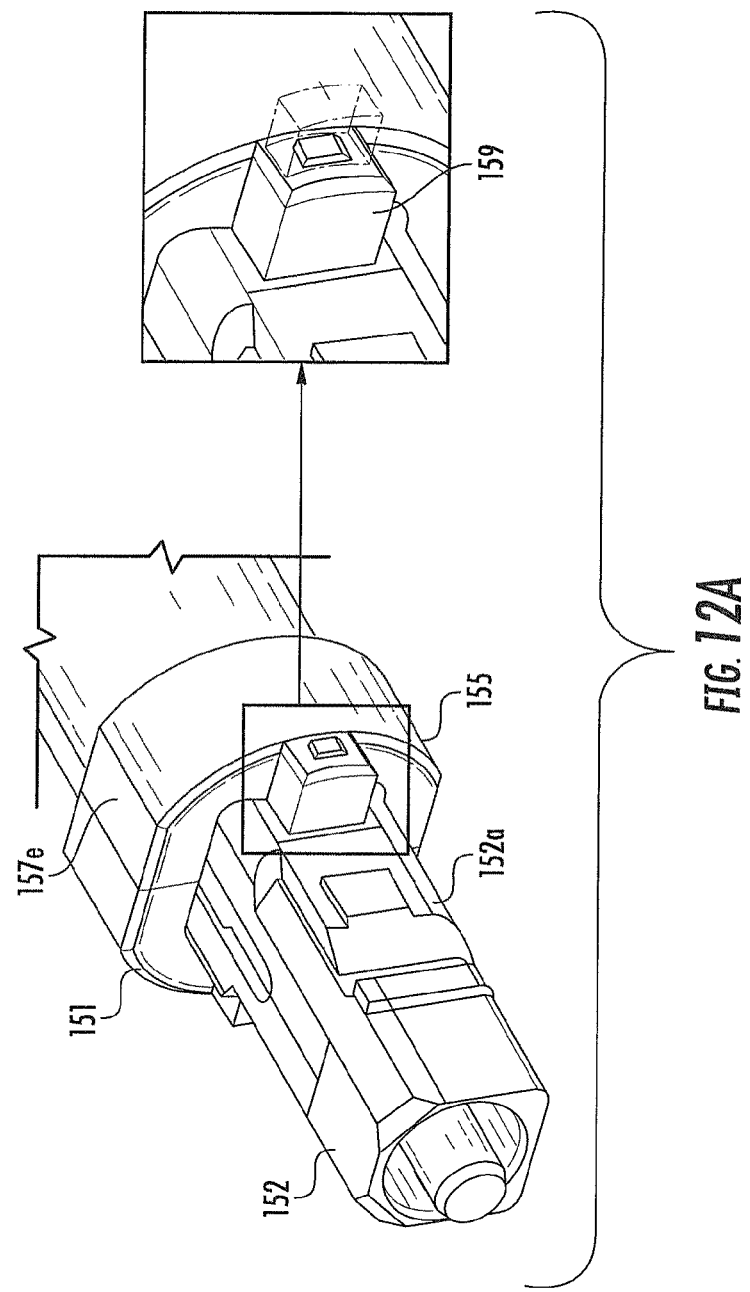

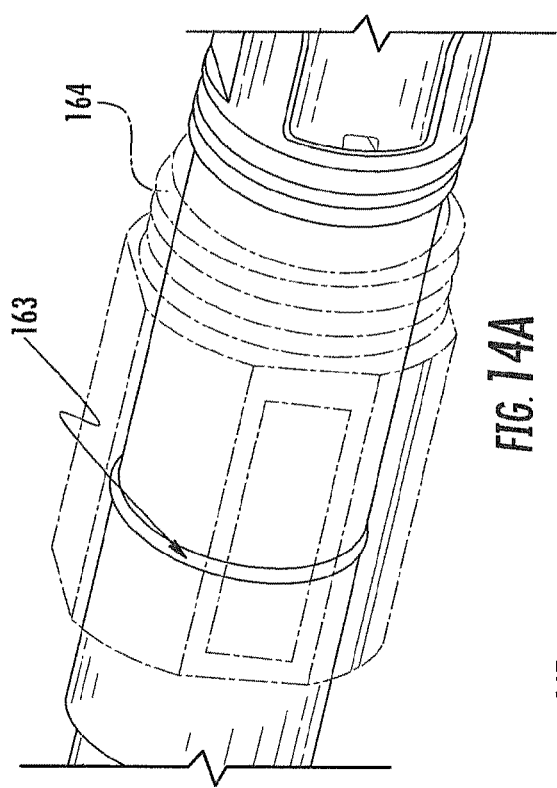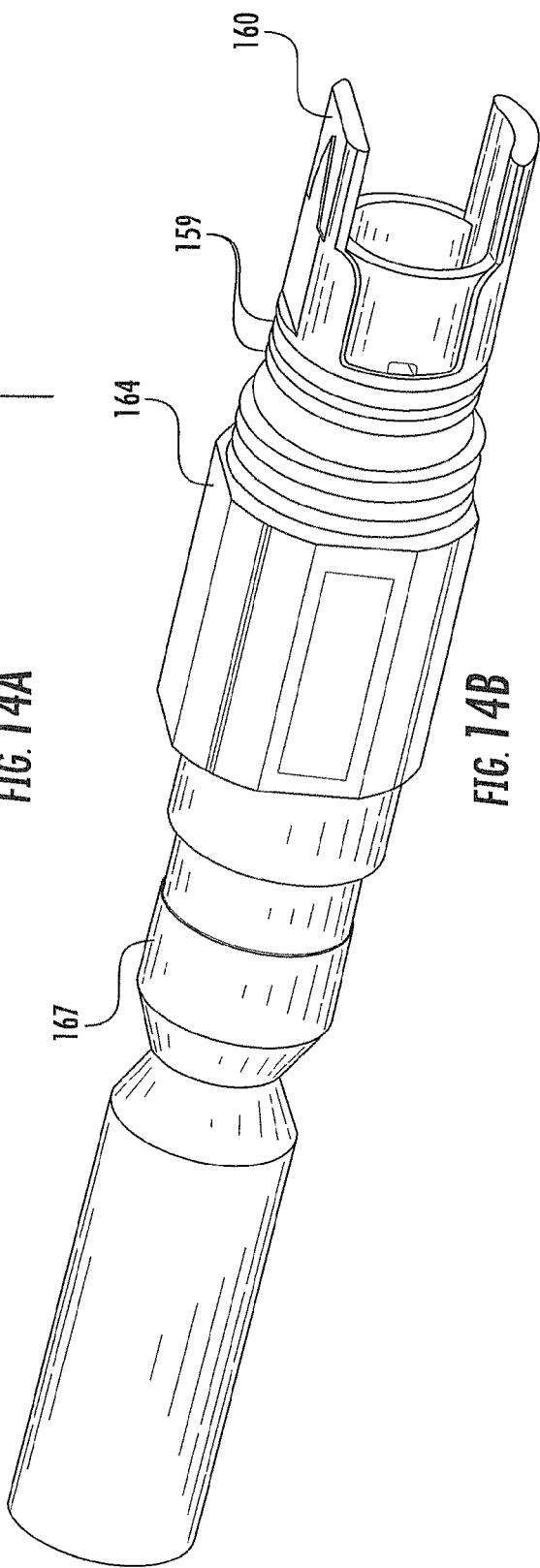

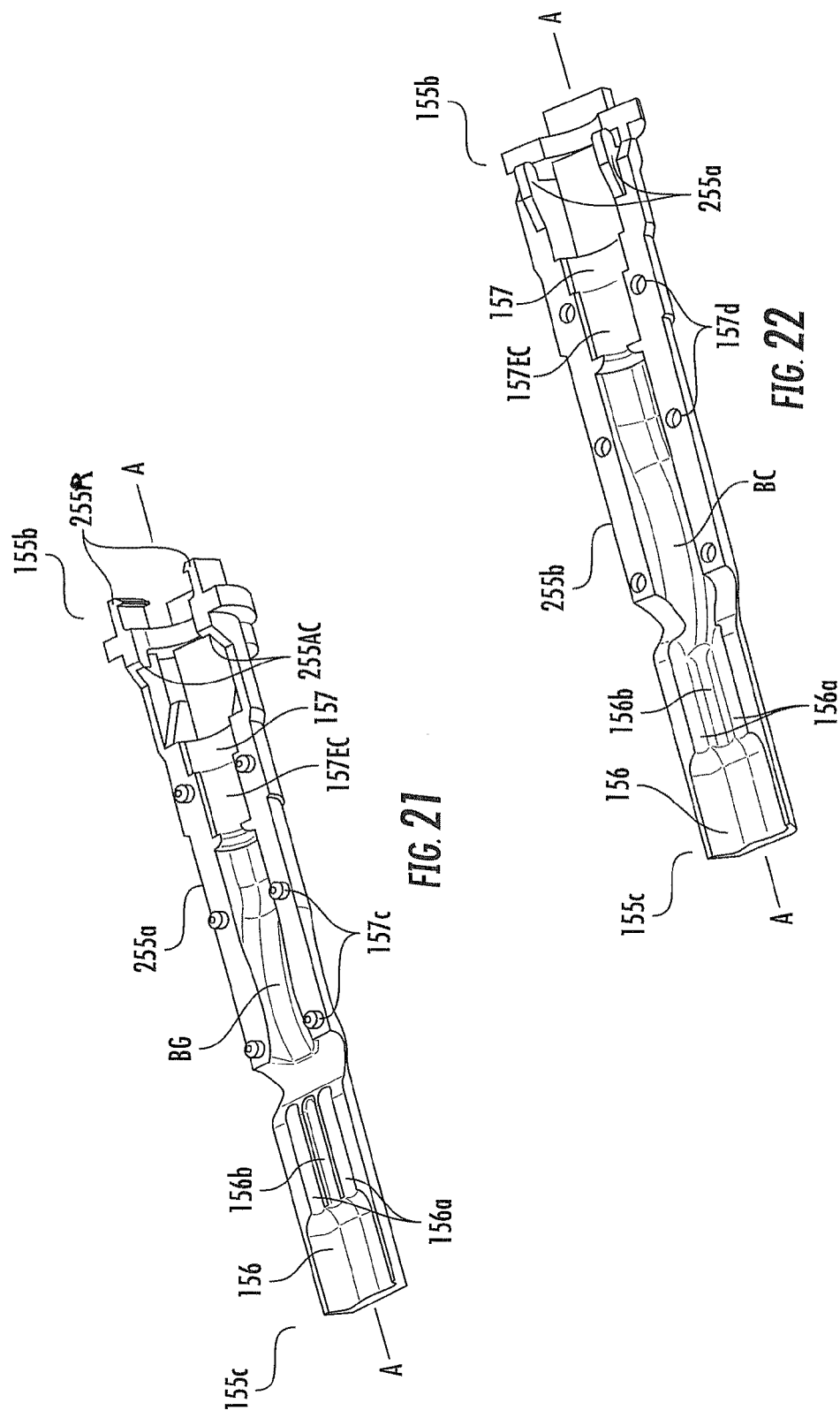

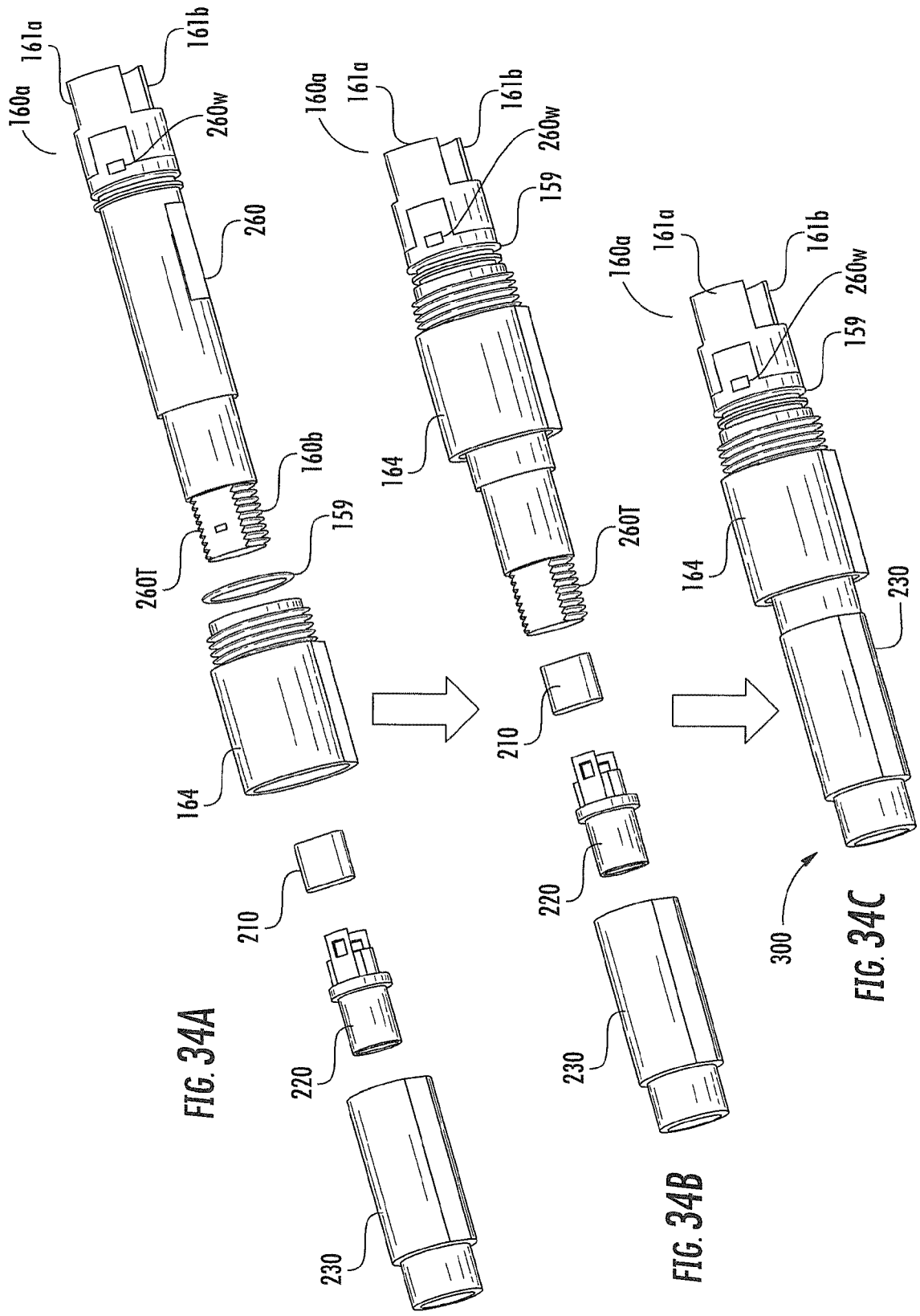

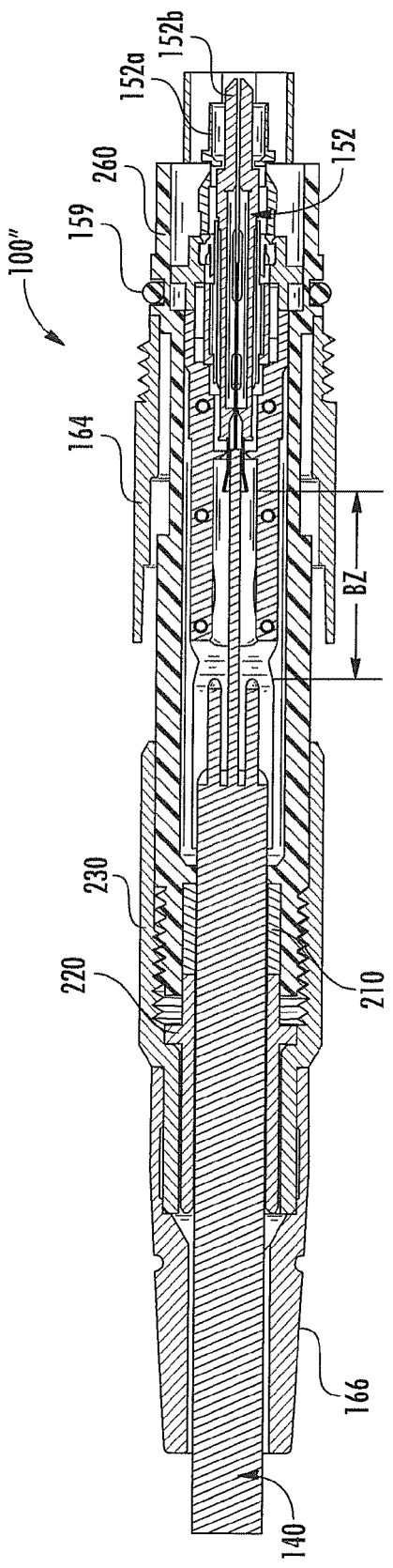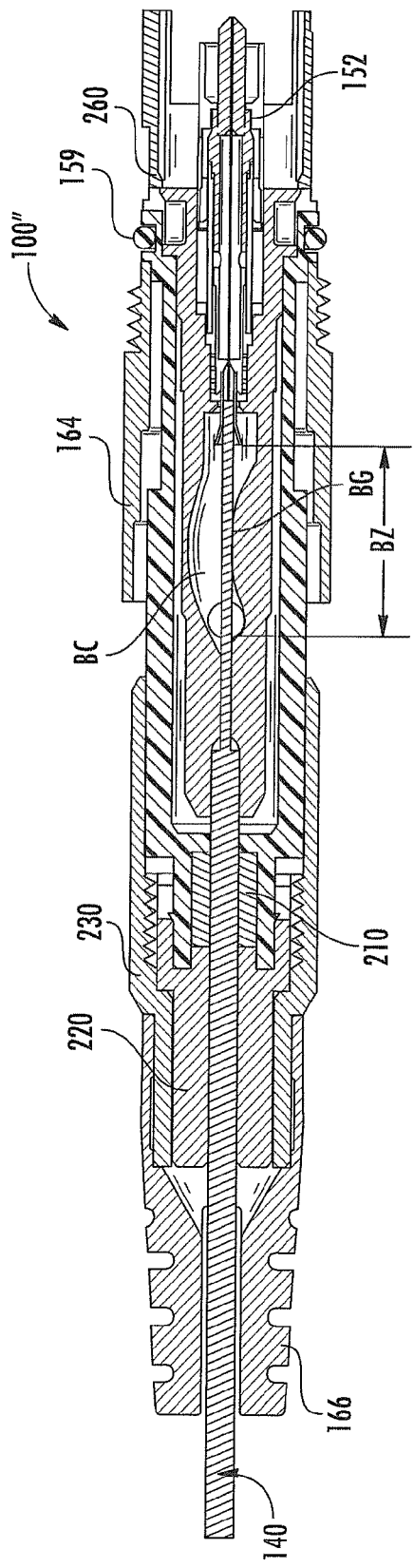
FIG. 36A
FIG. 36B

HARDENED FIBER OPTIC CONNECTORS HAVING A MECHANICAL SPLICE CONNECTOR ASSEMBLY

PRIORITY APPLICATIONS

This application is a continuation of International Application No. PCT/US17/13164, filed on Jan. 12, 2017, which claims the benefit of priority to U.S. Provisional Application No. 62/277,659, filed on Jan. 12, 2016, and U.S. Provisional Application No. 62/294,443, filed on Feb. 12, 2016, the contents of which are relied upon and incorporated herein by reference in their entirety.

FIELD

The disclosure is directed to hardened fiber optic connectors having a mechanical splice connector assembly. The hardened connectors are useful for optical communication as a portion of a cable assembly having an optical waveguide.

BACKGROUND

Communication networks are used to transport a variety of signals such as voice, video, data transmission, and the like. As communication networks upgrade to increase bandwidth to the subscriber, the transmission of signals using optical waveguides is commonly used.

Since these last mile deployments to the subscriber are typically located outdoors, the network operators typically use a preconnectorized cable assembly terminated with a hardened connector for making a quick, reliable and trouble-free optical connection to the network. The preconnectorized cable assembly is manufactured in a factory so that the end face of the ferrule and optical waveguides undergo a precise, multi-step polishing for maintaining a low insertion loss for the optical connection. Examples of preconnectorized cable assemblies terminated with a hardened connector are shown in U.S. Pat. No. 7,881,576 and its related applications.

However, there are instances when network operators desire to terminate hardened connectors in the field. One common way to make an optical connection is by fusion splicing. Fusion splicing requires that the ends of the optical fibers be precisely aligned so that the transfer the optical signal between the ends of the optical waveguides has a relatively low-loss. But like connectors, fusion splicing requires highly trained craftsman and special equipment to make and test the optical connection, thereby making it a relatively expensive and inefficient proposition for field connectorization. Moreover, the actual fusion splice point is fragile and must be immobilized so it does not bend or flex. Consequently, fusion-splicing requires a splice holder that prevents bending and stress on the splice point, which results in a bulkier cable assembly and adds more time, cost and skill to the installation costs. For these reasons, the network operators typically have not widely-deployed fusion-spliced solutions for fiber to the subscriber applications.

Consequently, there is an unresolved need for an efficient and relatively low-cost method of reliably making hardened optical connections in the field without using specialized equipment and highly skilled labor.

BRIEF DESCRIPTION OF THE FIGS

Figure 5:
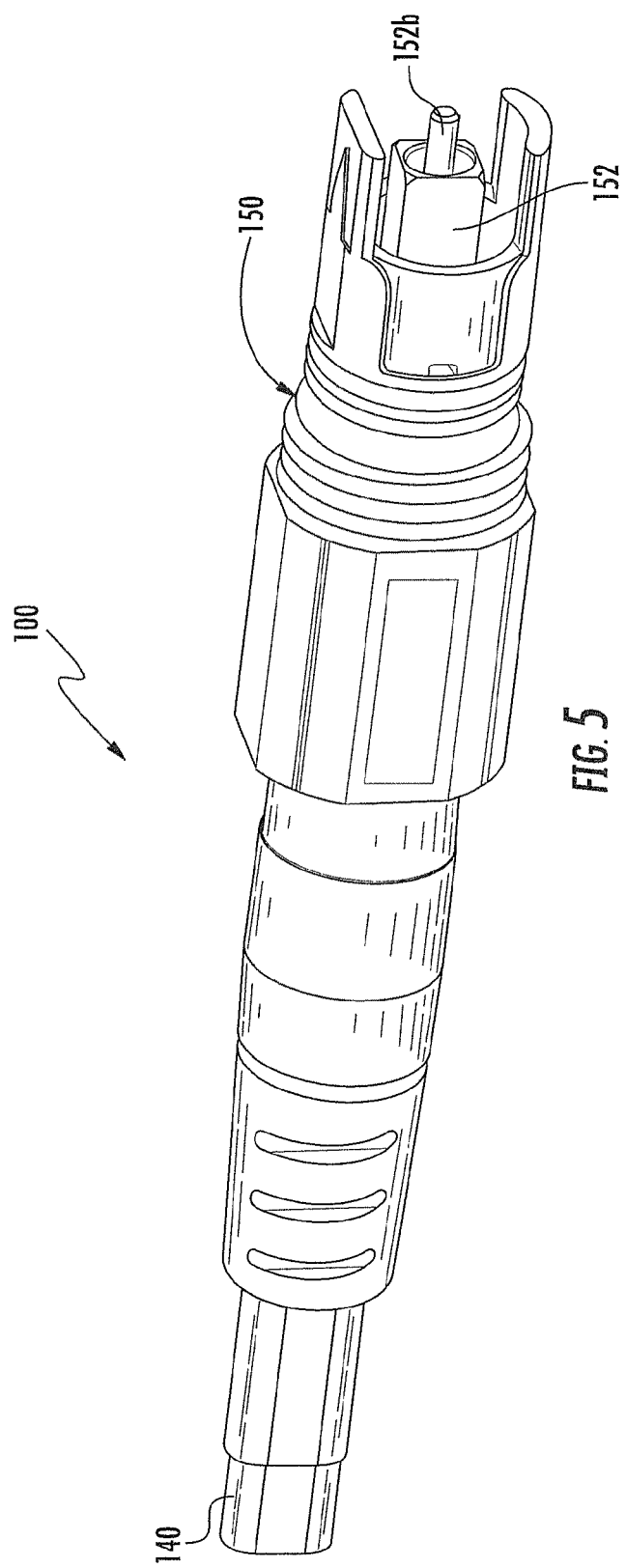
FIG. 5 is a perspective view of an explanatory cable assembly comprising a hardened connector comprising a mechanical splice connector assembly according to the concepts of the present application.
Figure 5B:
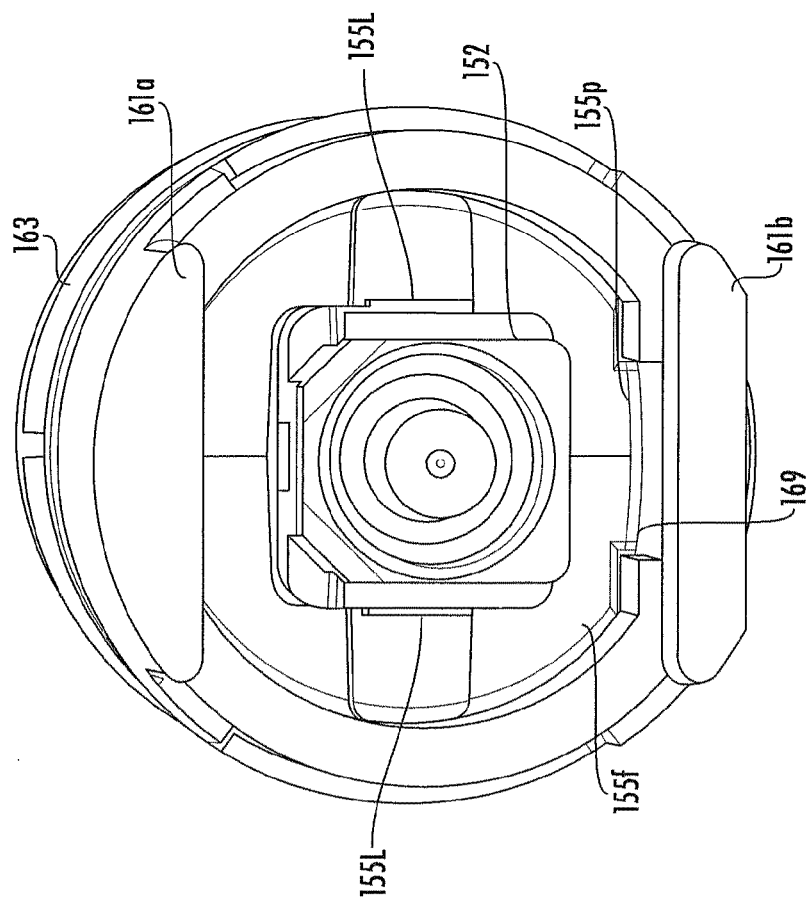
Figure 5A:
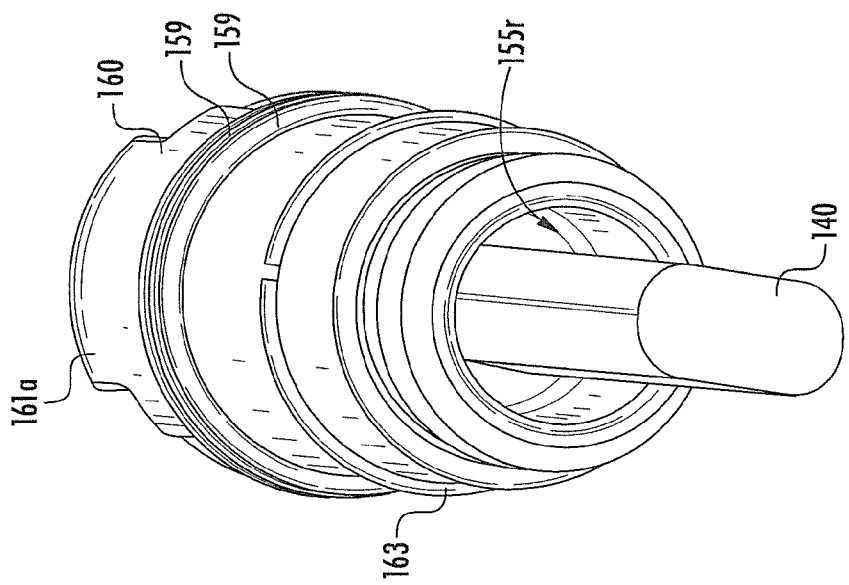

FIGS. 5A and 5B respectively are partially assembled rear perspective view and front perspective view of the cable assembly of FIG. 5.

Figure 6:
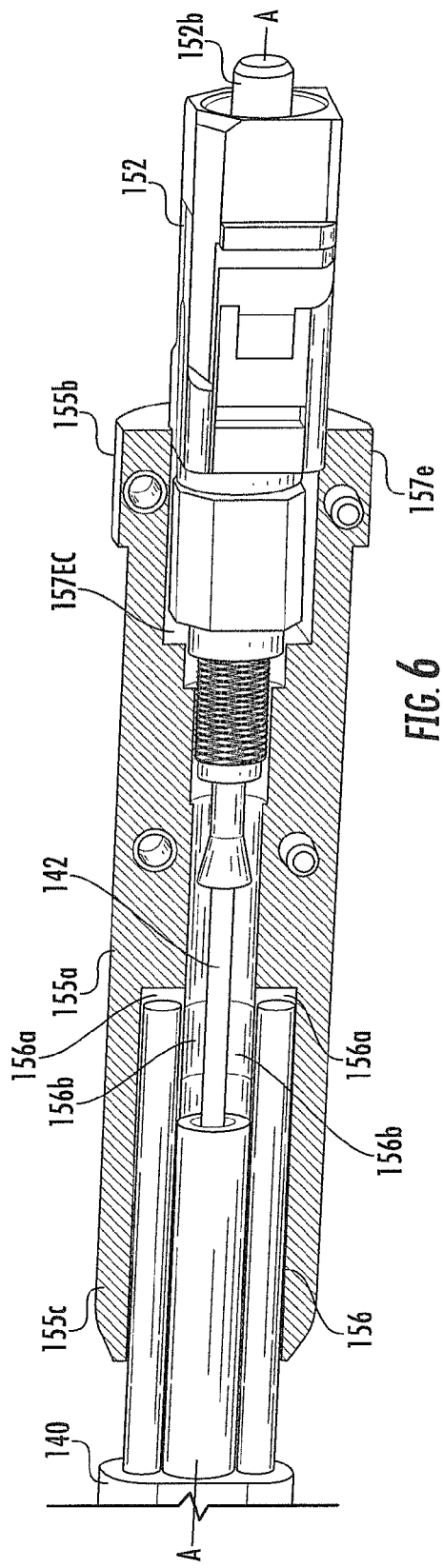

FIG. 6 shows a partially assembled perspective view of the hardened connector of FIG. 5 as part of a cable assembly showing one shell of the inner housing having a connector assembly receiving portion with an extended length cavity so the ferrule assembly of mechanical splice connector assembly may translate rearward as needed.

FIG. 6A shows a partially assembled perspective view of another hardened connector for a cable assembly similar to FIG. 5 showing one shell of the inner housing that receives the ferrule assembly only when the cam of the mechanical splice connector assembly is in a clamping orientation within the extended length cavity.

Figure 7:
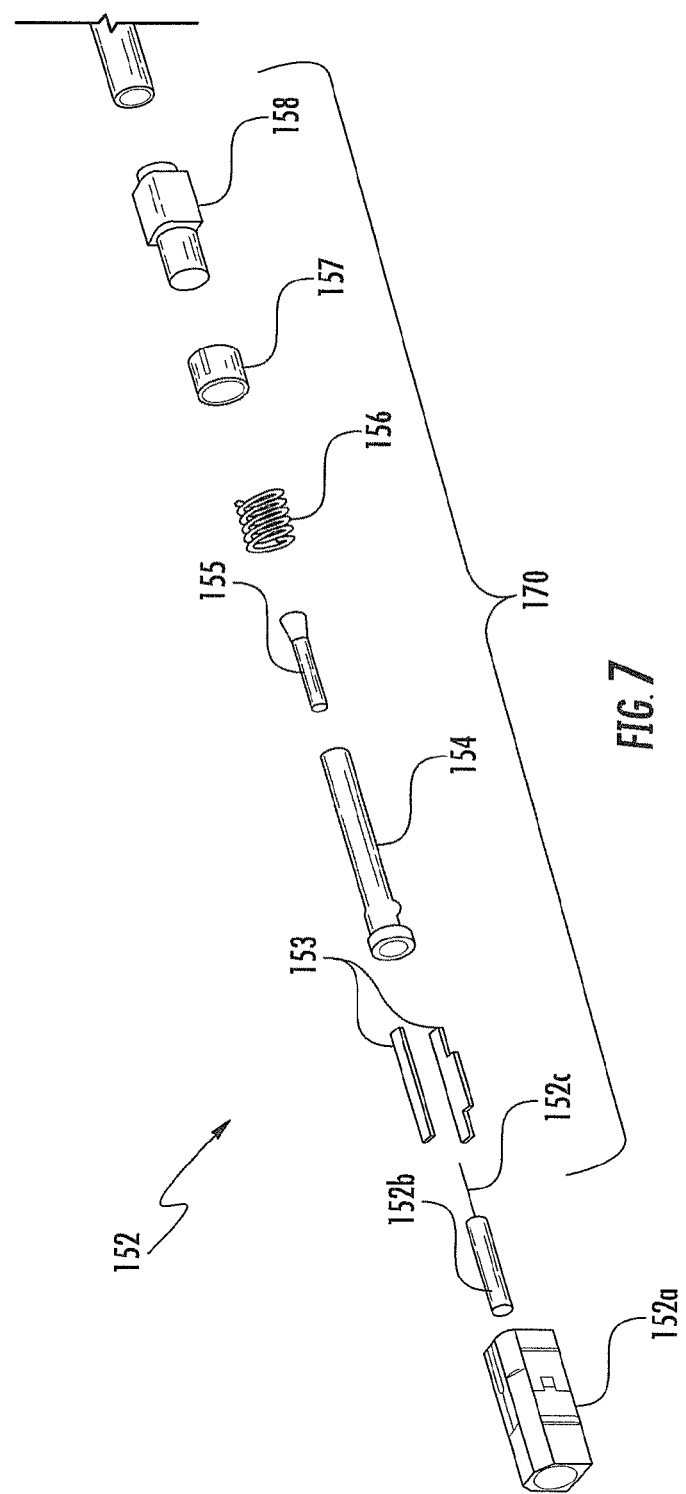

FIG. 7 is a partially exploded view of an explanatory mechanical splice connector assembly used in the hardened connector of FIG. 5.

FIGS. 8-15 depict steps for assembling the hardened connector of FIG. 5.

Figure 16:
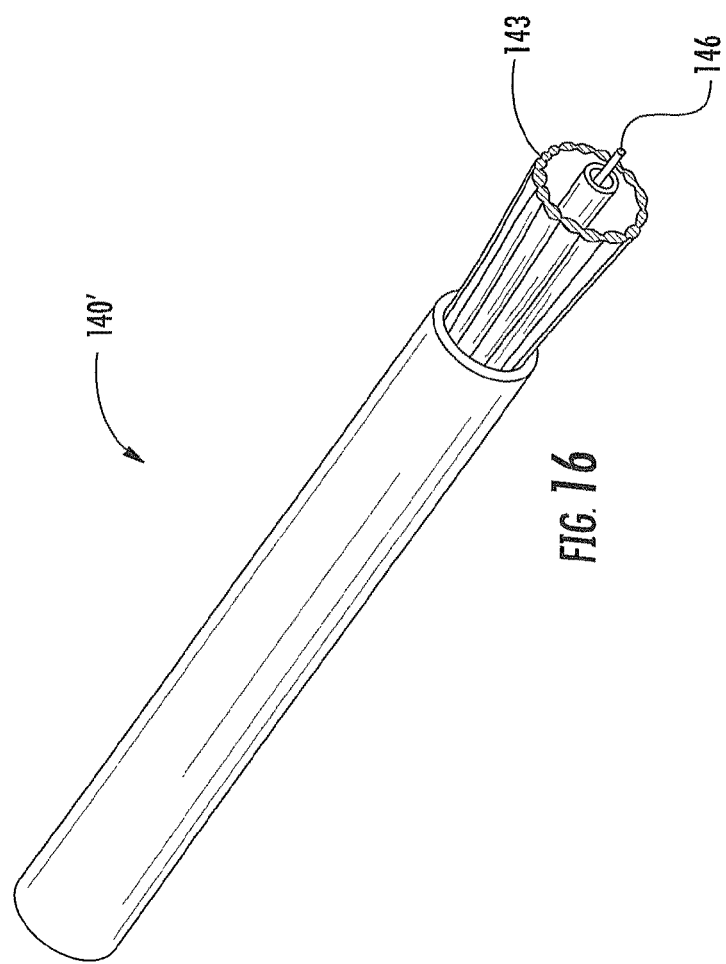
Figure 17:
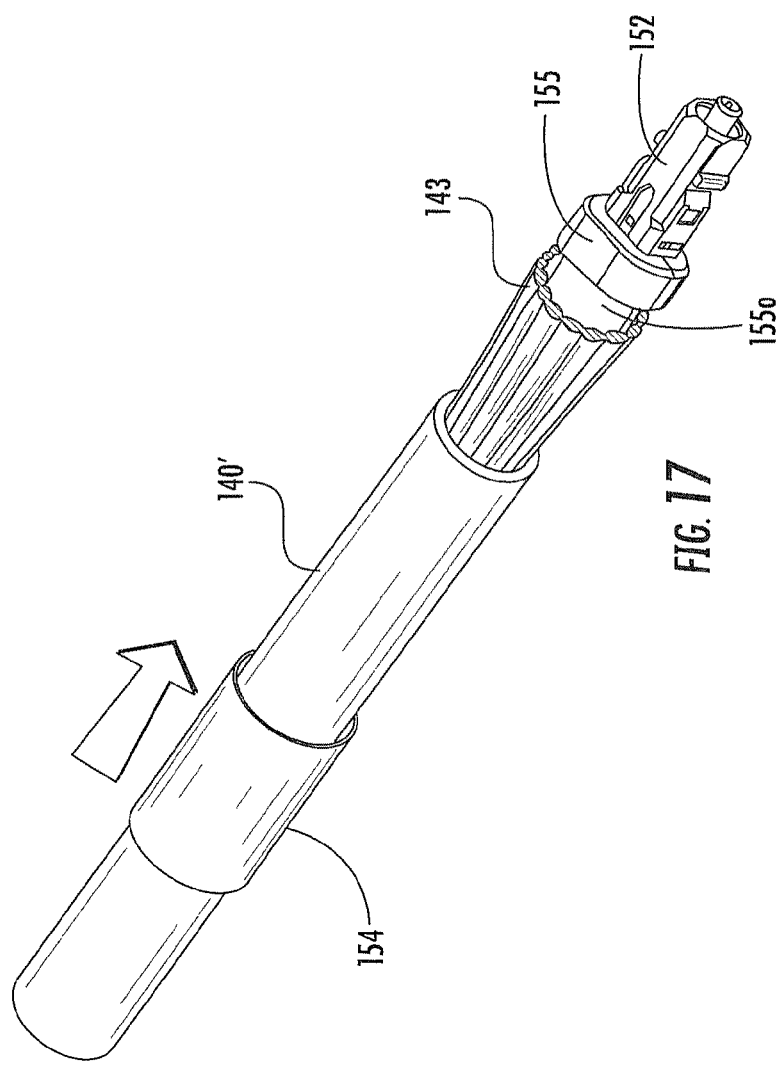

FIGS. 16 and 17 depict another fiber optic cable that may be used with the hardened connector of FIG. 5.

Figure 18:
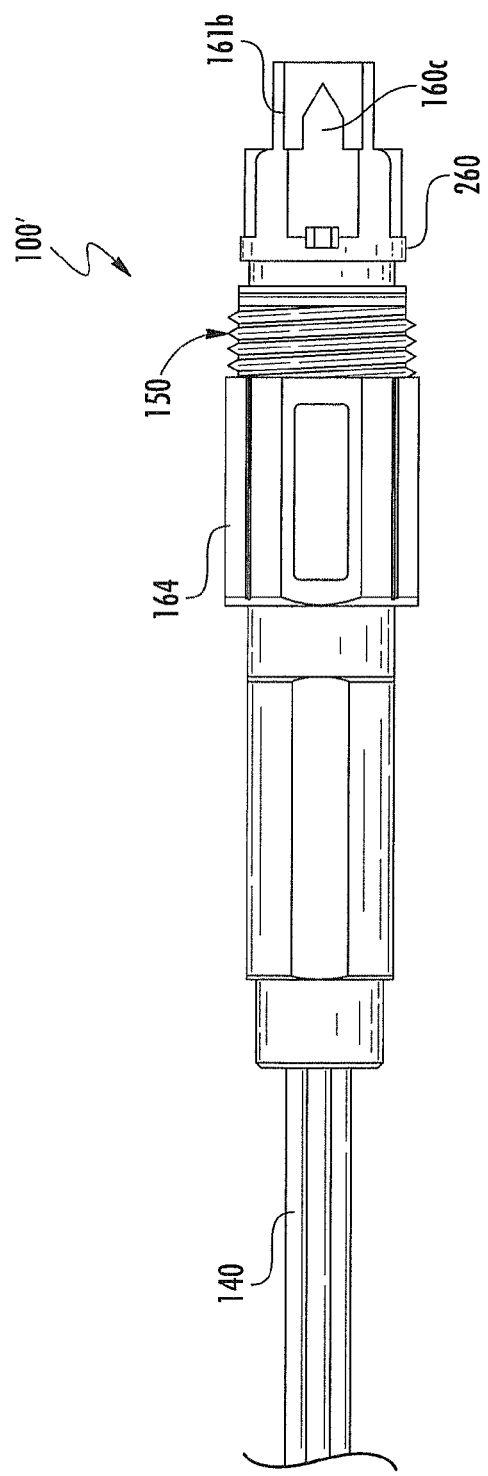

FIG. 18 is a top view of another explanatory cable assembly comprising a hardened connector comprising a mechanical splice connector assembly according to the concepts of the present application.

Figure 19:
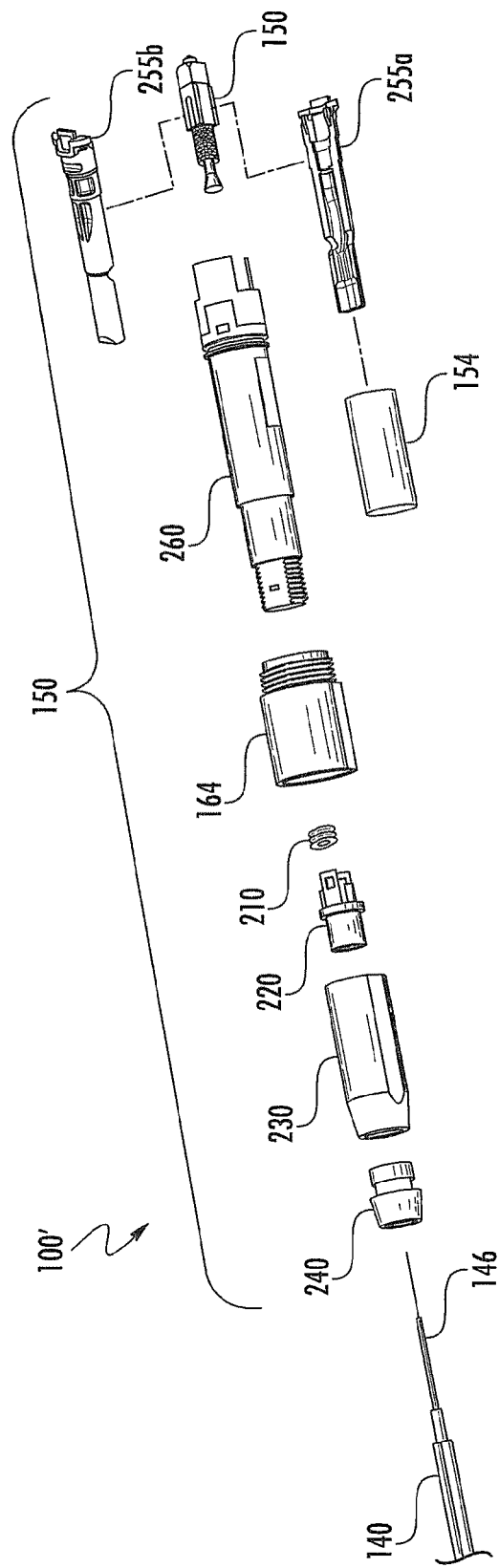

FIG. 19 is a partially exploded view of an explanatory cable assembly with a mechanical splice connector assembly used in the hardened connector similar to FIG. 18.

Figure 20:
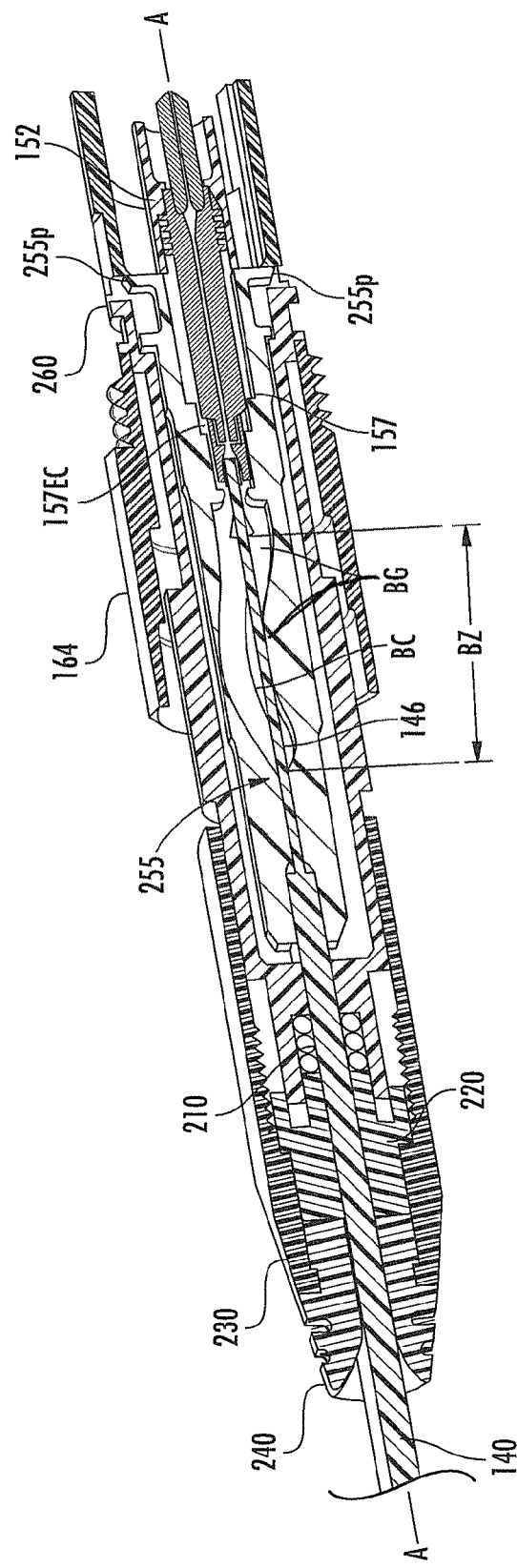

FIG. 20 is a longitudinal sectional view of the cable assembly of FIG. 19.

FIGS. 21 and 22 are perspective views of a first shell and a second shell of the cable assembly of FIG. 19 showing internal details of the shells.

Figure 23A:
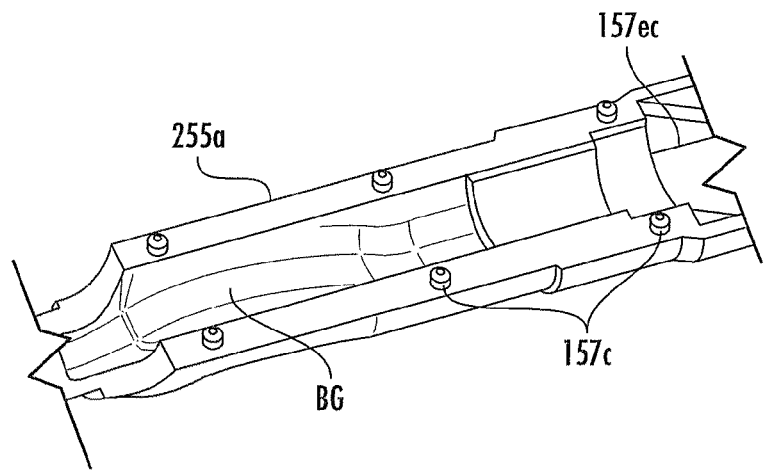
Figure 23B:
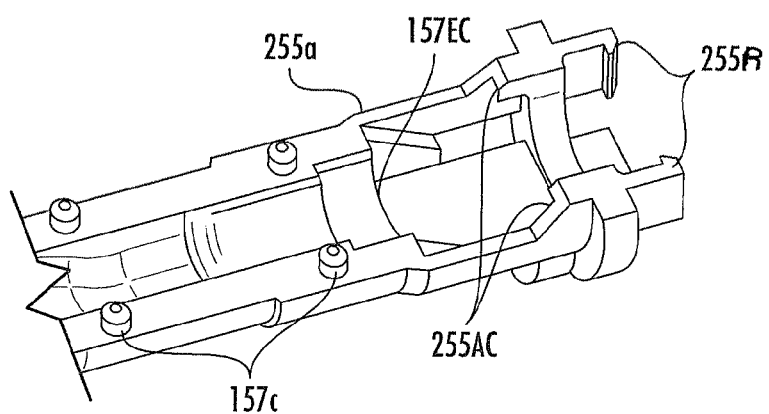

FIGS. 23A and 23B are close-up perspective views of the first shell of FIG. 21.

Figure 24A:
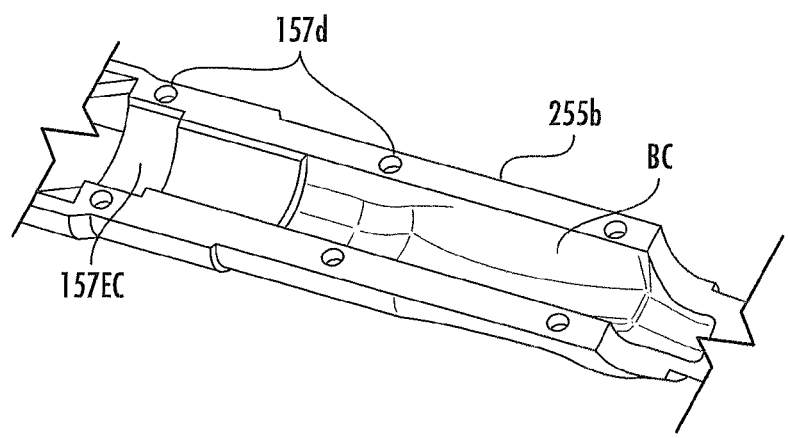
Figure 24B:
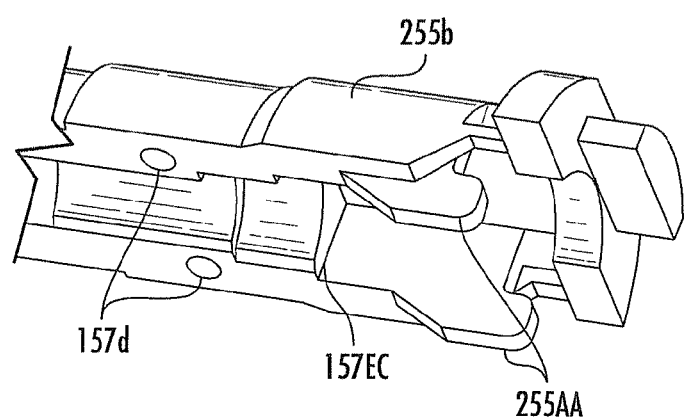

FIGS. 24A and 24B are close-up perspective views of the second shell of FIG. 22.

Figure 25:
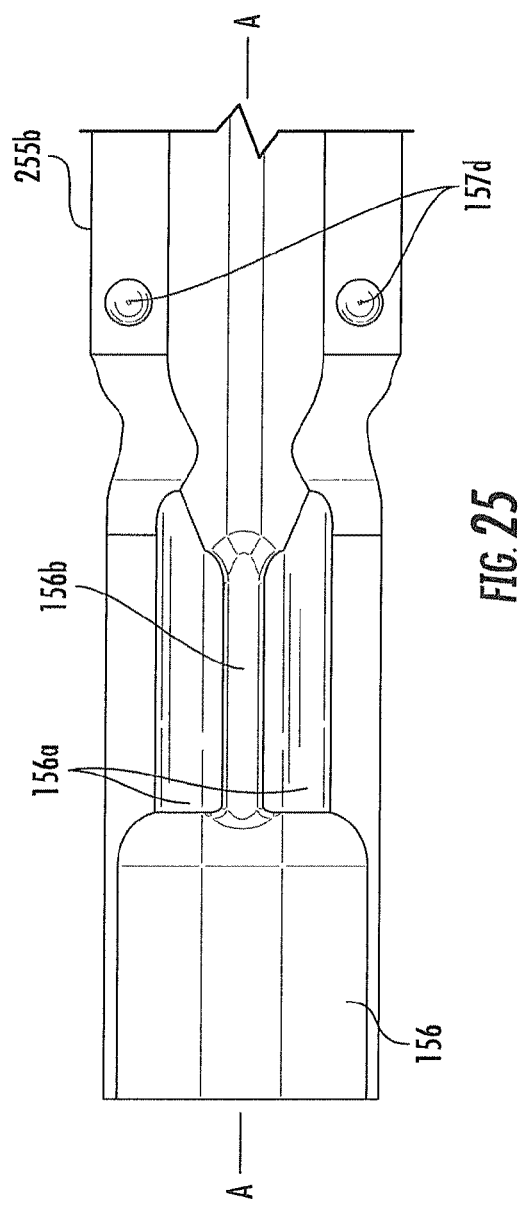
Figure 26:
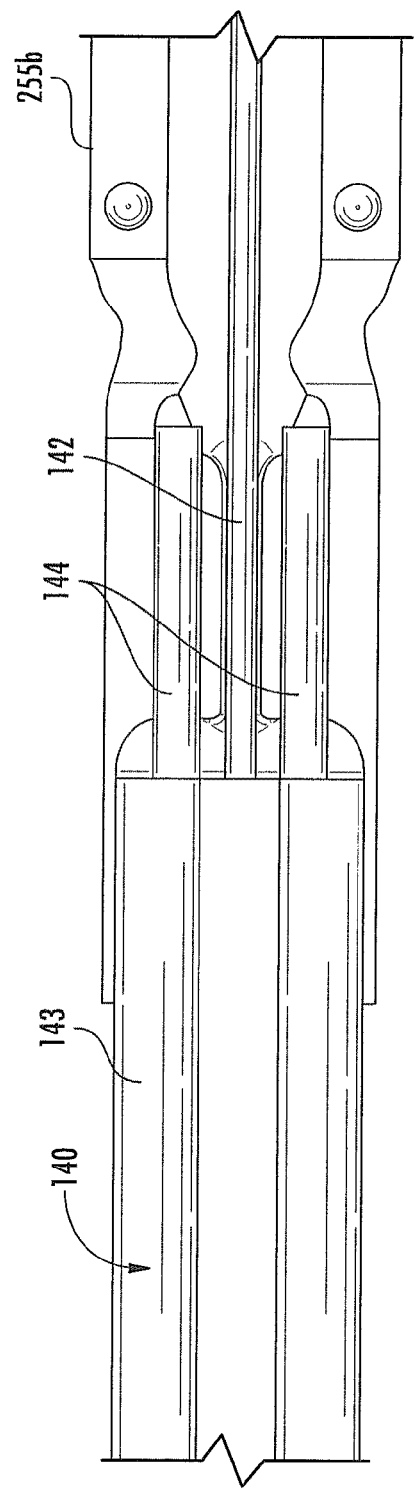

FIGS. 25 and 26 are close-up perspective views of a rear portion of the second shell and a prepared cable placed into the rear portion of the second shell, respectively.

Figure 27:
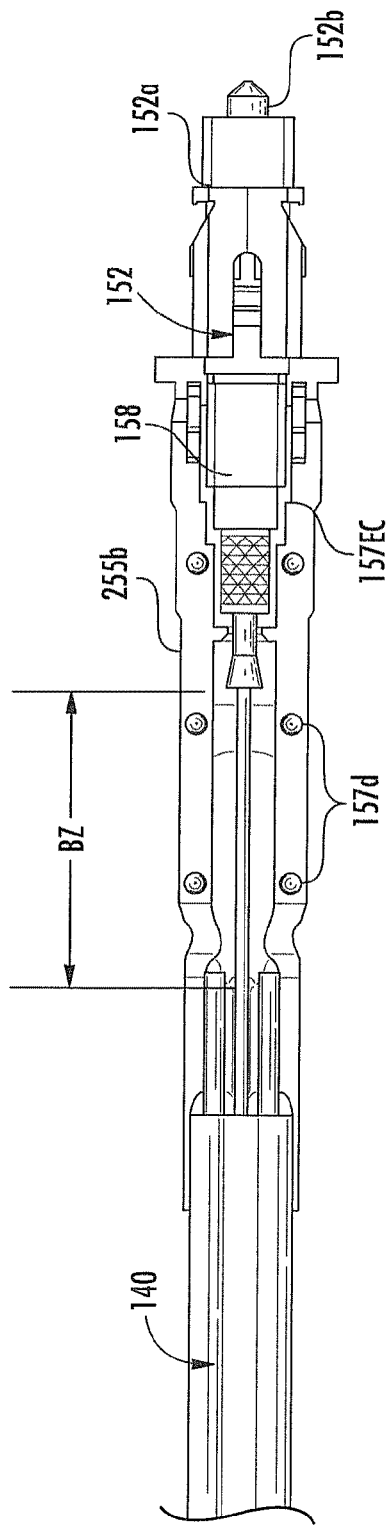

FIG. 27 is a top view showing the second shell and a prepared cable with its mechanical splice connector assembly attached placed into the second shell.

Figure 28:
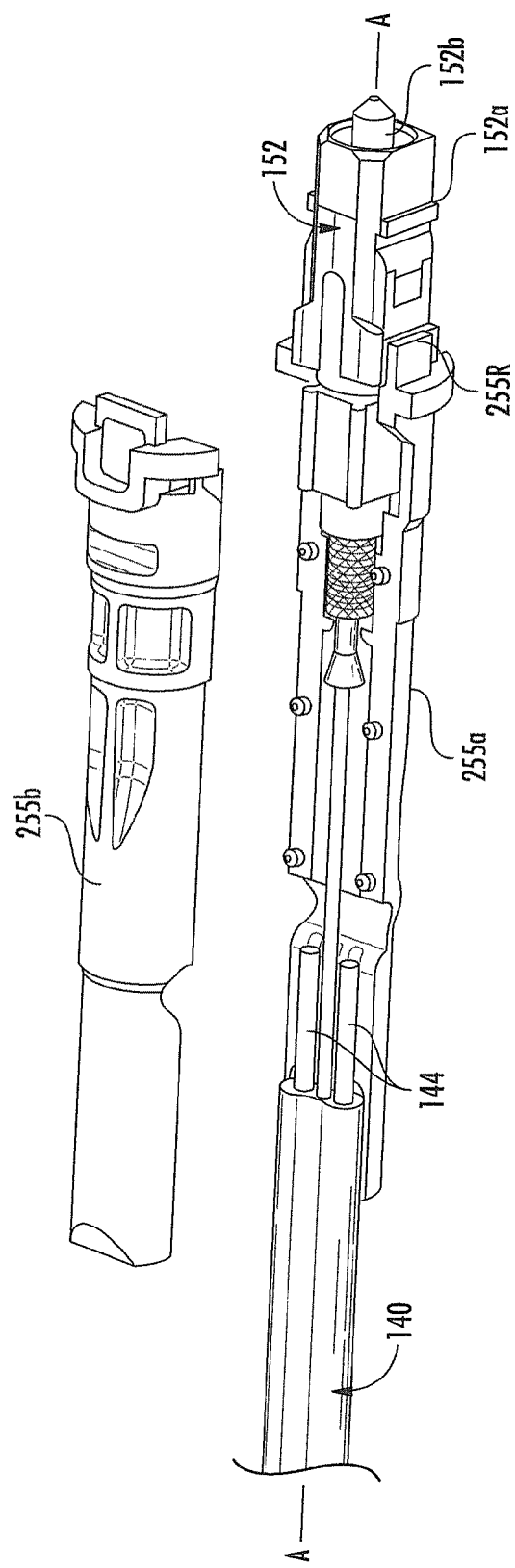

FIG. 28 is a perspective view showing the first and second shells with the prepared cable with its mechanical splice connector assembly attached.

Figure 29:
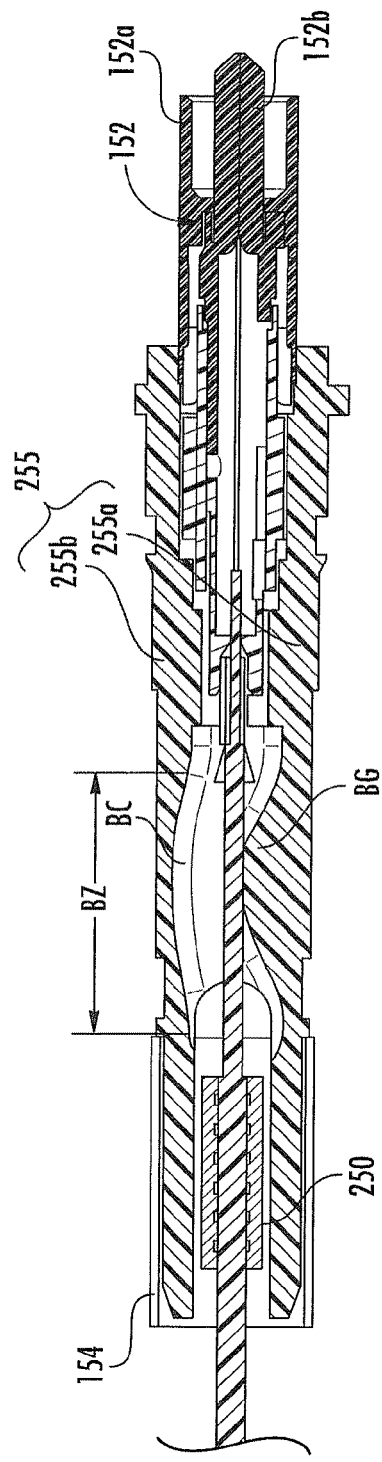

FIG. 29 is a perspective view showing the first and second shells disposed about the prepared cable with its mechanical splice connector assembly attached with the crimp band positioned on a rearward portion of the first and second shells along with an optional insert disposed about the cable.

Figure 30:
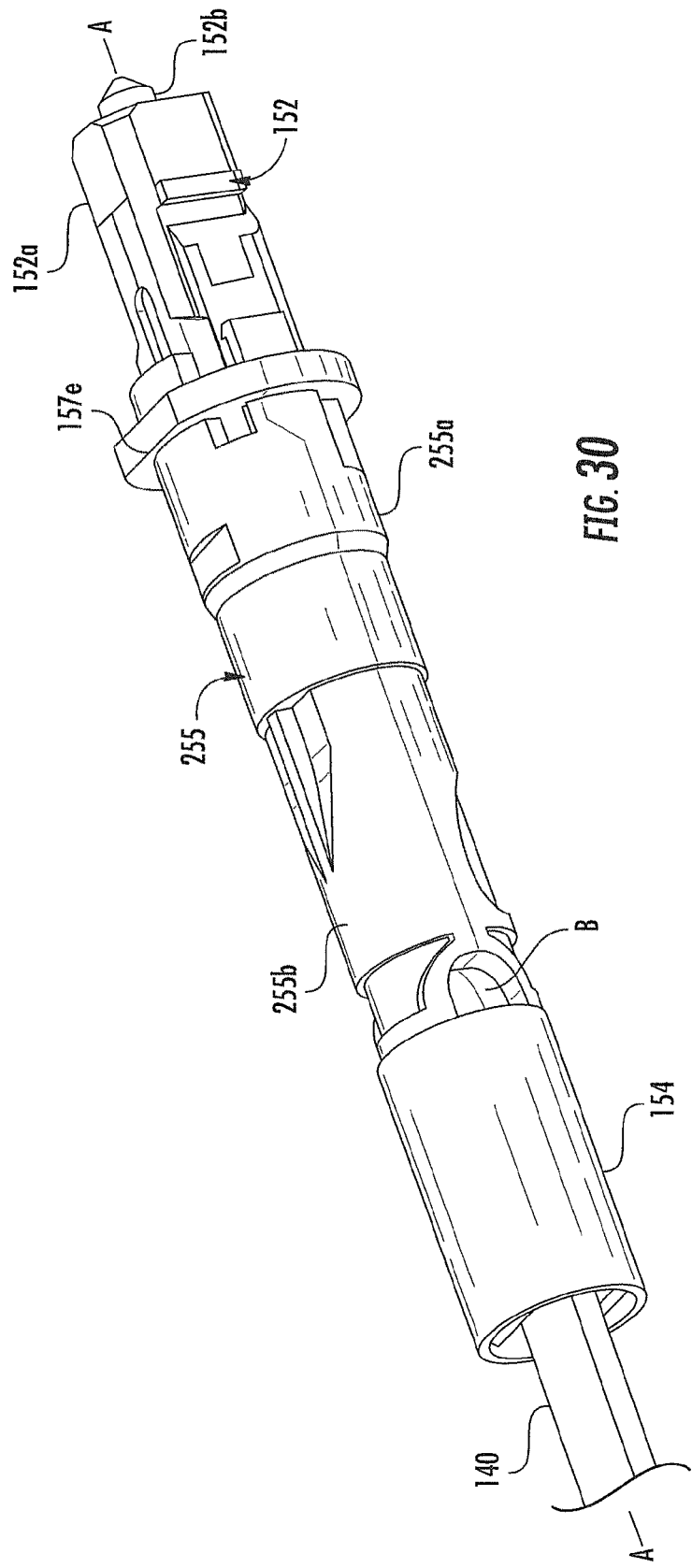

FIG. 30 is a longitudinal sectional view showing the first and second shells disposed about the prepared cable with its mechanical splice connector assembly attached and depicting a buckling zone formed by the first and second shells.

Figure 31:
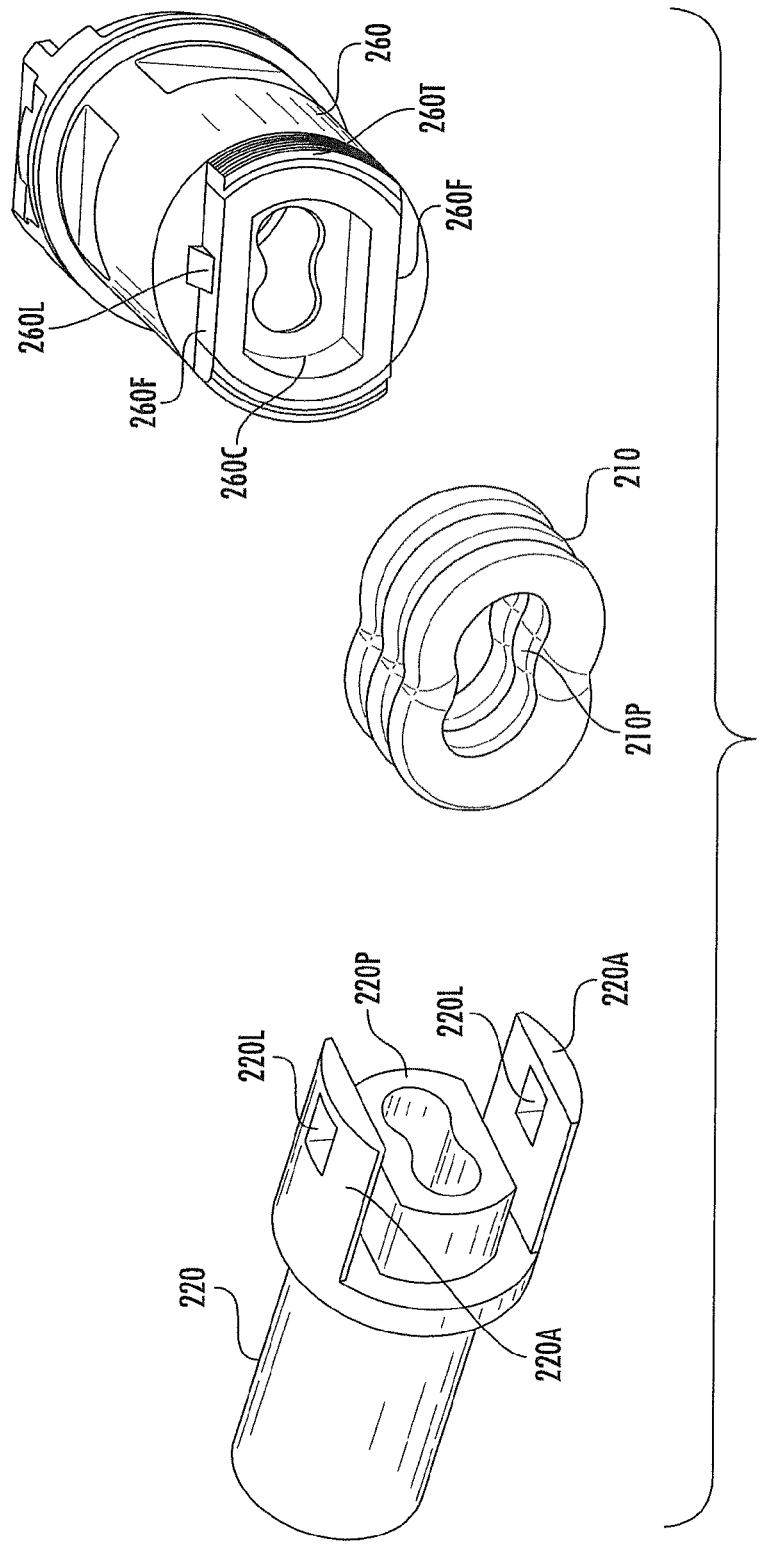
Figure 32:
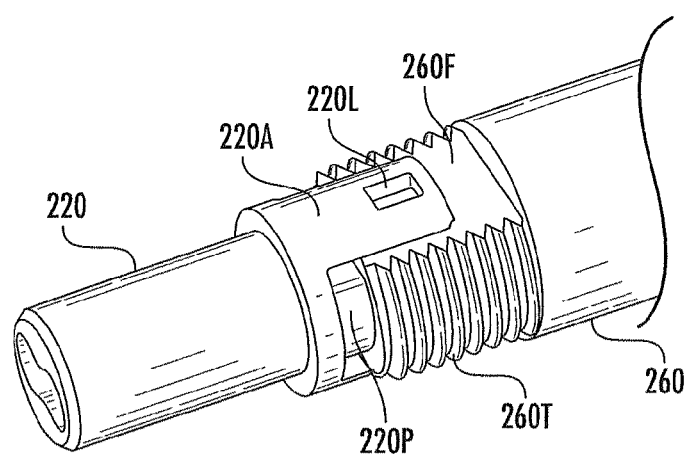

FIGS. 31 and 32 are close-up rear perspective views of a portion of a shroud, a cable sealing element and a pusher of FIG. 19 in an unassembled state and an assembled state, respectively.

Figure 33:
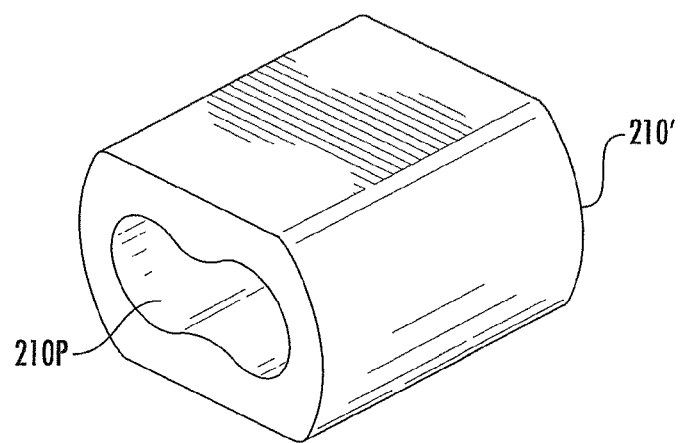

FIG. 33 is a perspective view of another cable sealing element that may be used with a cable having a different profile for making the connector adaptable to other cable types.

FIGS. 34A-34C are perspective views depicting a pre-assembly of a plurality of parts, thereby allowing the user to quickly and easily terminate a cable to the connector.

Figure 34D:
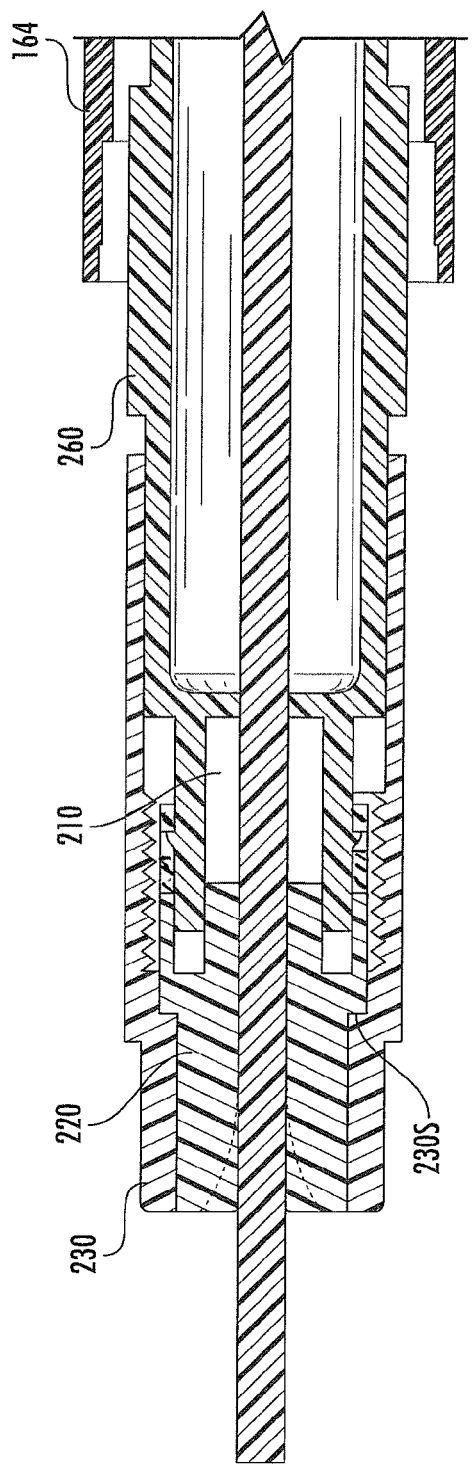

FIG. 34D is a partial sectional view of FIG. 34C showing the arrangement of the pre-assembly with a cable attached thereto.

Figure 35:
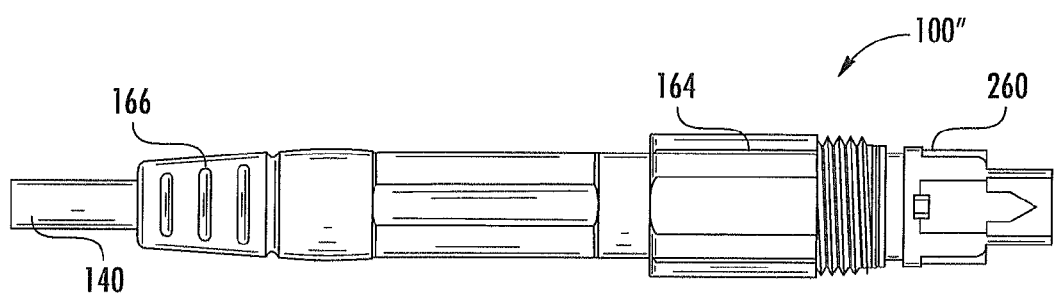

FIG. 35 is a top view of another explanatory cable assembly similar to FIG. 18 that further includes a boot for cable bend-relief.

FIGS. 36A and 36B are longitudinal sectional views of the cable assembly of FIG. 35.

FIGS. 37A-37E are perspective views showing the assembly steps of the cable assembly of FIG. 35.

Figure 37A:
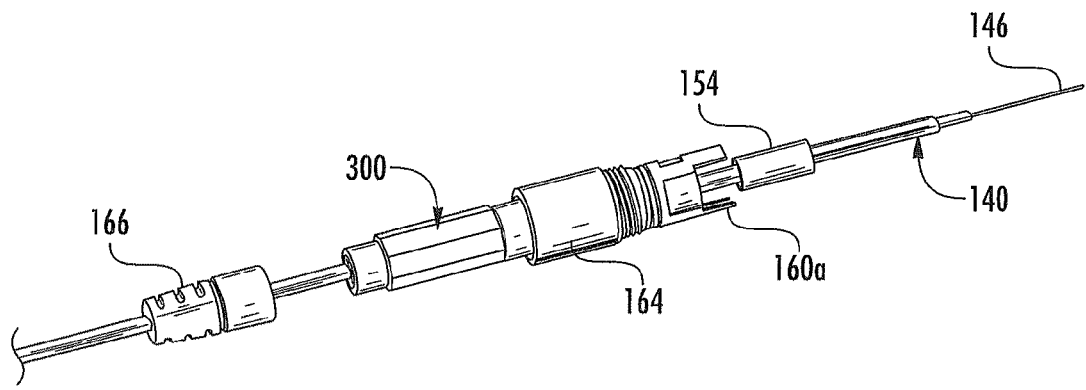
Figure 37B:
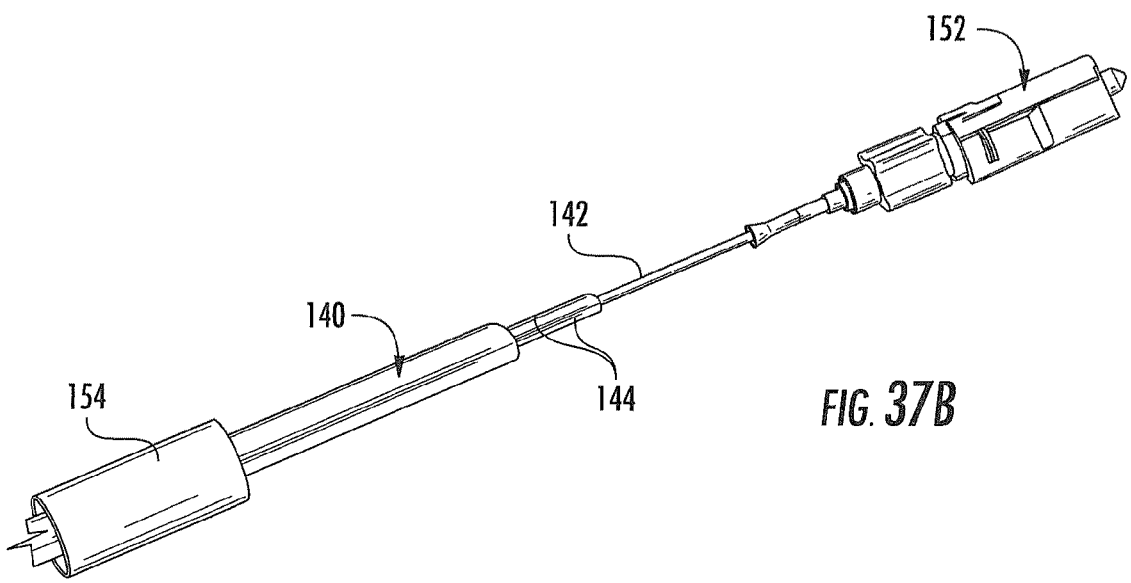
Figure 37C:
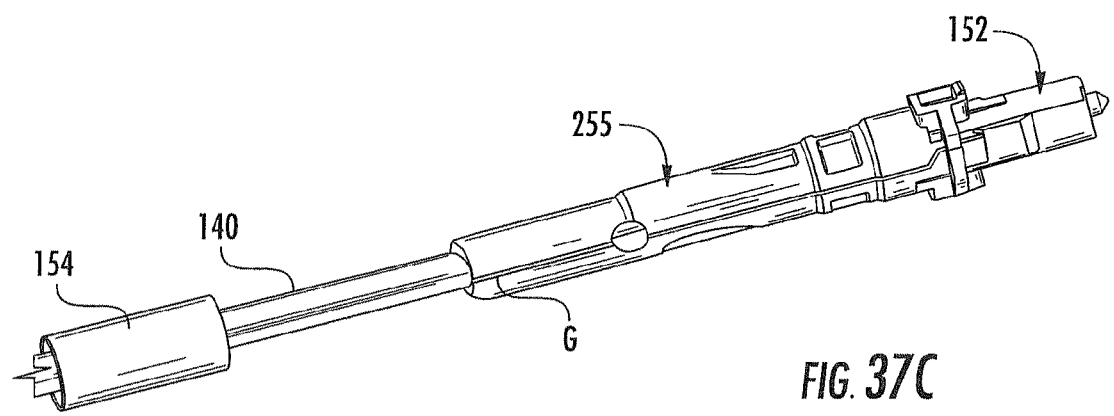
Figure 37D:
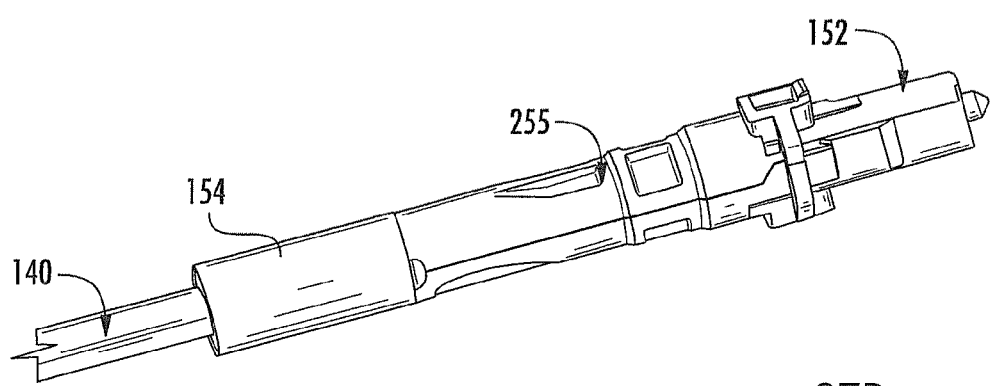
Figure 37E:
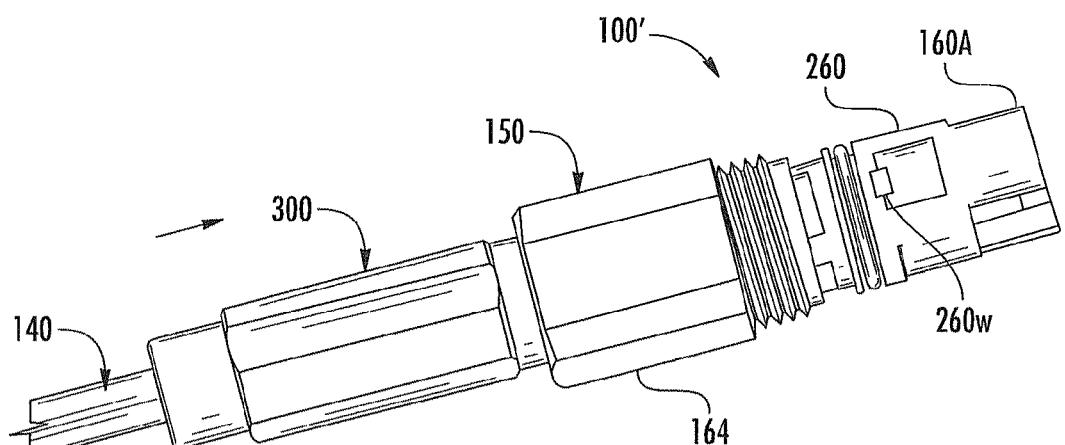
Figure 37F:
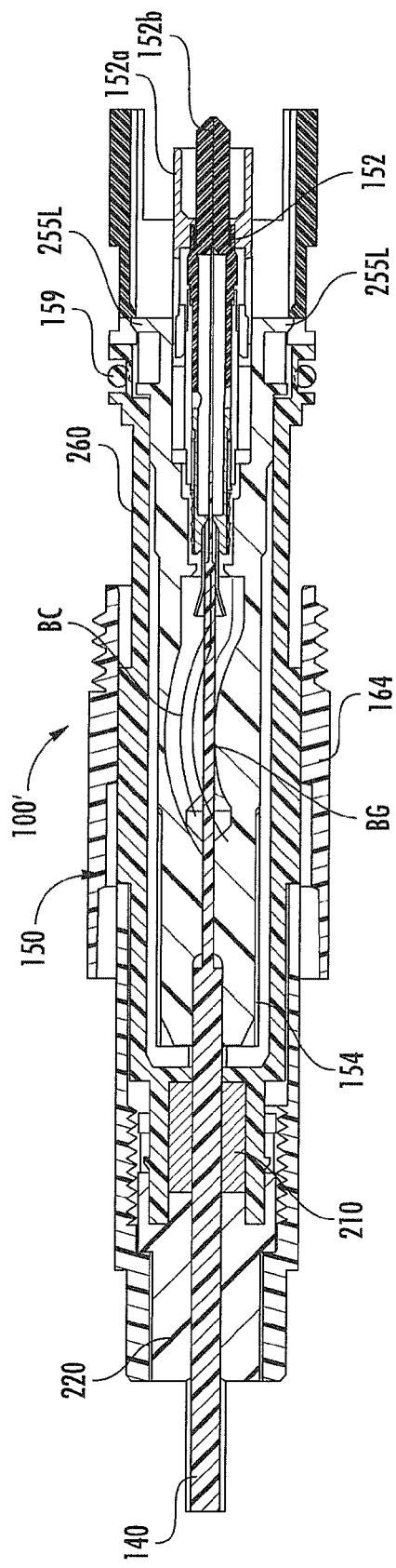

FIG. 37F is a sectional view showing the advancement of the pusher to deform the cable sealing element about the cable during assembly and strain relieve the cable.

DETAILED DESCRIPTION

The concepts will now be described more fully hereinafter with reference to the accompanying drawings showing preferred embodiments. The concepts may, however, be embodied in many different forms and should not be construed as limited to the embodiments set forth herein, rather, these embodiments are provided so that the disclosure will fully convey the scope of the concepts to those skilled in the art. The drawing are not necessarily drawn to scale but are configured to clearly illustrate the concepts.

The present application is directed to hardened optical connectors having a mechanical splice connector assembly. The mechanical splice connector assembly has a stub fiber that is mechanically spliced to an optical fiber of a cable (i.e., a field-fiber) by the user such as in the field. The mechanical splice connector assembly also includes other components for actuating and securing a mechanical splice between the stub fiber and the field fiber. Conventional prior art hardened connectors used connector assemblies that were attached directly to the optical waveguide of a fiber optic cable in a factory making them then ready for termination without further preparation by the user.

However, preconnectorized cable assembly 10 has some perceived disadvantages over factory prepared solutions such as coming in predetermined lengths and stocking and availability of several different lengths for installation. Thus, in many installations a longer preconnectorized cable assembly is selected and installed with the slack length of the cable of the preconnectorized cable assembly being either stored in a suitable manner such as a slack loop or the end of the cable is cut to length and the excess cable is thrown away. Many network operators would like to use bulk cable and install the hardened connector in the field to avoid the issues of slack storage or cutting the preconnectorized cable assembly to length and throwing away the excess. Thus, the concepts disclosed herein are advantageous over the prior art.

Figures 1A, 1B:
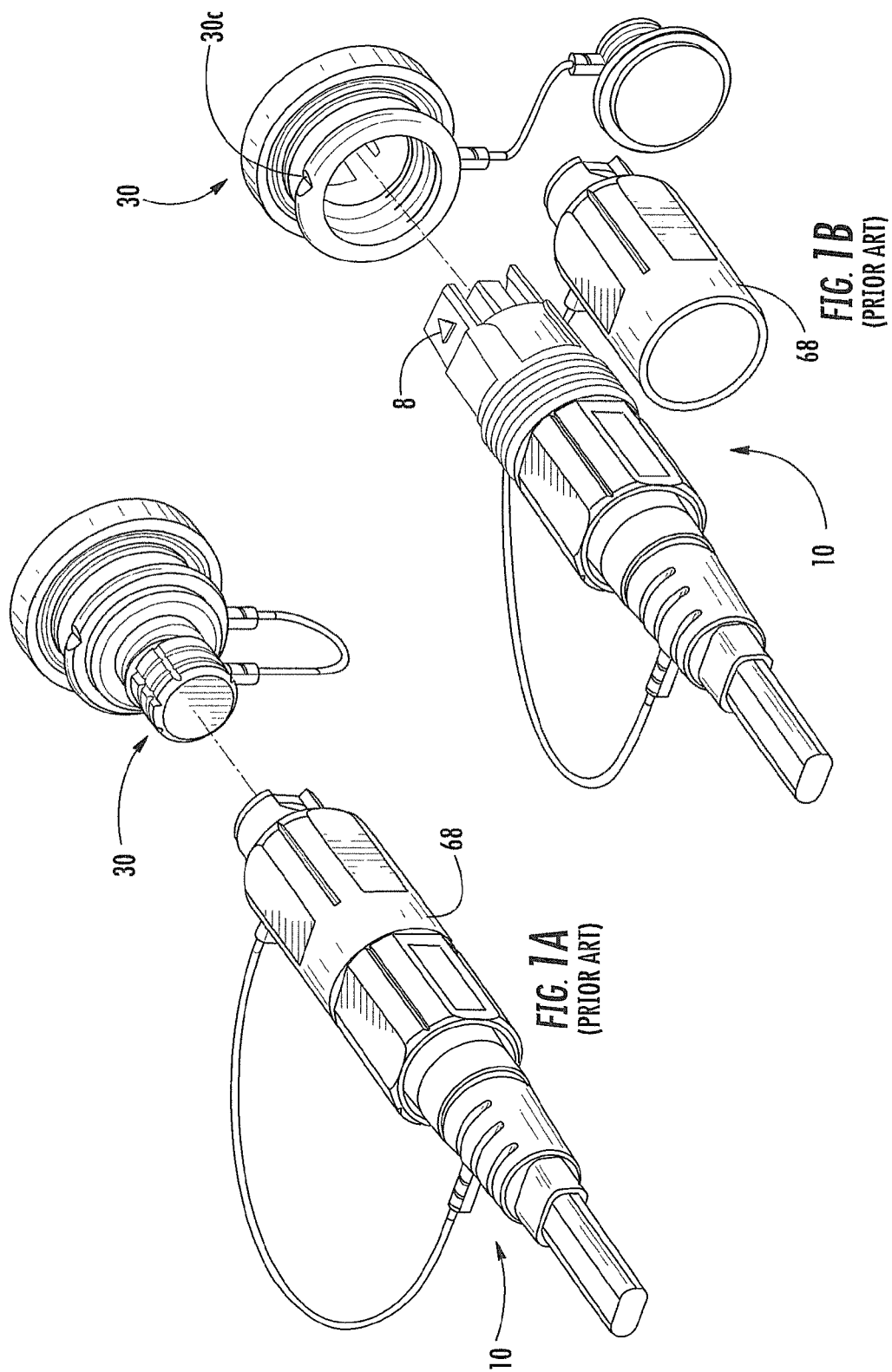
FIGS. 1a-1c shows a portion of a prior art the preconnectorized cable assembly terminated with a hardened connector being plugged into a receptacle.
Figure 1C:
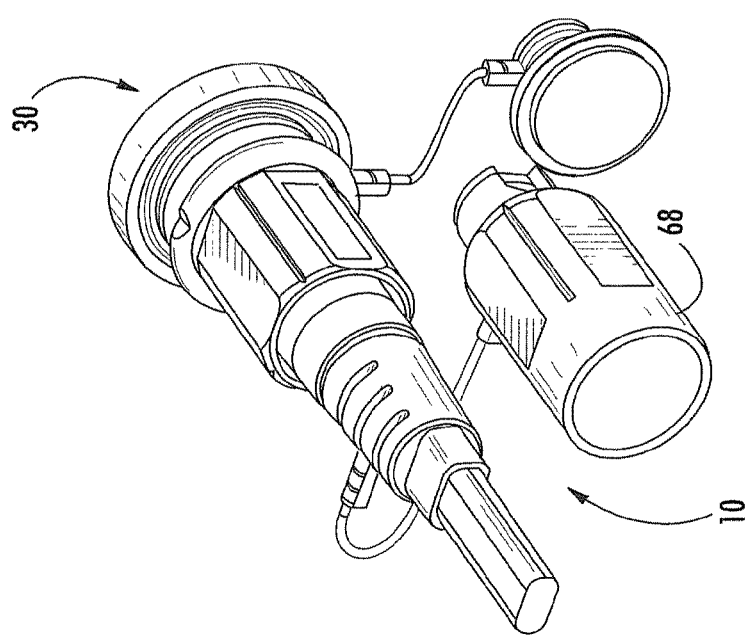

FIGS. 1a-1c show the various stages during the mating of a hardened connector of the conventional prior art preconnectorized cable assembly 10 with a complimentary receptacle 30. Unlike the concepts of the present application, the preconnectorized cable assembly 10 of the prior art does not provide a field-installable solution for the network operator, but instead is a factory terminated solution. A more detailed view of the prior art preconnectorized cable assembly 10 is provided with reference to FIGS. 1-4 before turning toward a more detailed explanation of the concepts disclosed herein.

Specifically, FIG. 1a shows receptacle 30 detached from preconnectorized cable assembly 10. Moreover, preconnectorized assembly cable 10 and receptacle 30 are depicted with their respective protective caps on. Protective cap 6 is used for shielding a conventional connector assembly 5, and in particular, the end face of a connector ferrule 5b from the elements and/or damage. Specifically, installed protective cap 6 isolates connector ferrule 5b from the elements and prevents it from being damaged during transportation and handling. FIG. 1b shows protective cap 6 removed from the end of the hardened connector preconnectorized cable assembly 10. Likewise, the respective cap of receptacle 30 is also removed. Preconnectorized cable assembly 10 is positioned to engage the complimentary portions of receptacle 30. Specifically, alignment indicia 8 of preconnectorized cable assembly 10 is positioned to its complementary indicia 30c of receptacle 30. FIG. 1c shows a mated connection between the preconnectorized cable assembly 10 and receptacle 30, thereby making an optical connection therebetween. This factory prepared cable assembly 10 does not require special equipment, training, or skill is required to make the optical connection. Thus, the labor cost of deploying the optical network to the premises is cost effective and efficient, but it does not provide the flexibility for the user on cable length.

Figure 2:
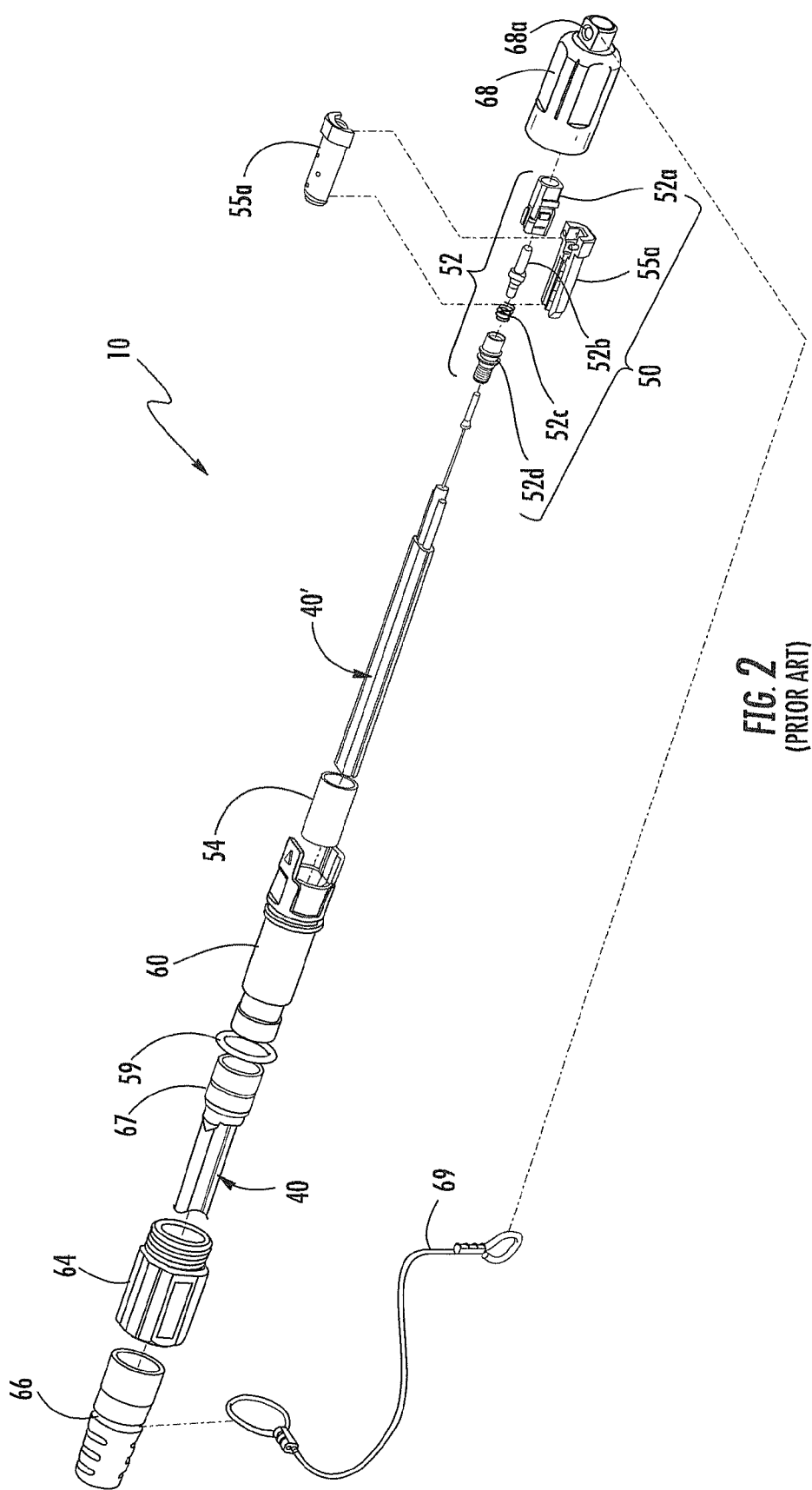
FIG. 2 is an exploded view of the prior art preconnectorized cable assembly depicted in FIGS. 1a-1c.
Figure 3:
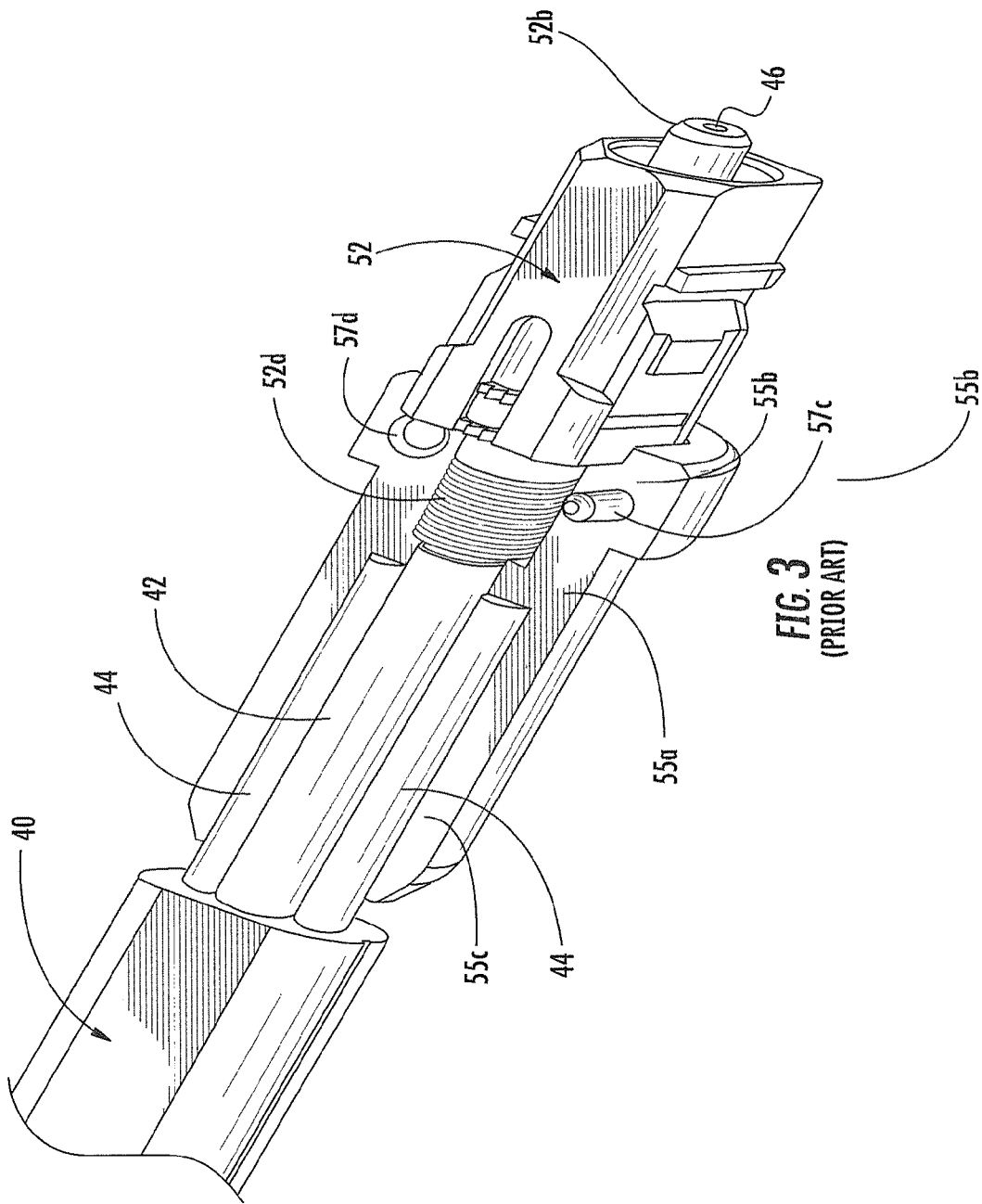
FIG. 3 shows a partially assembled perspective view of the conventional prior art preconnectorized cable assembly of FIG. 2 having the connector assembly attached to the optical waveguide of the cable and positioned within the half-shell of the hardened connector.
Figure 4:
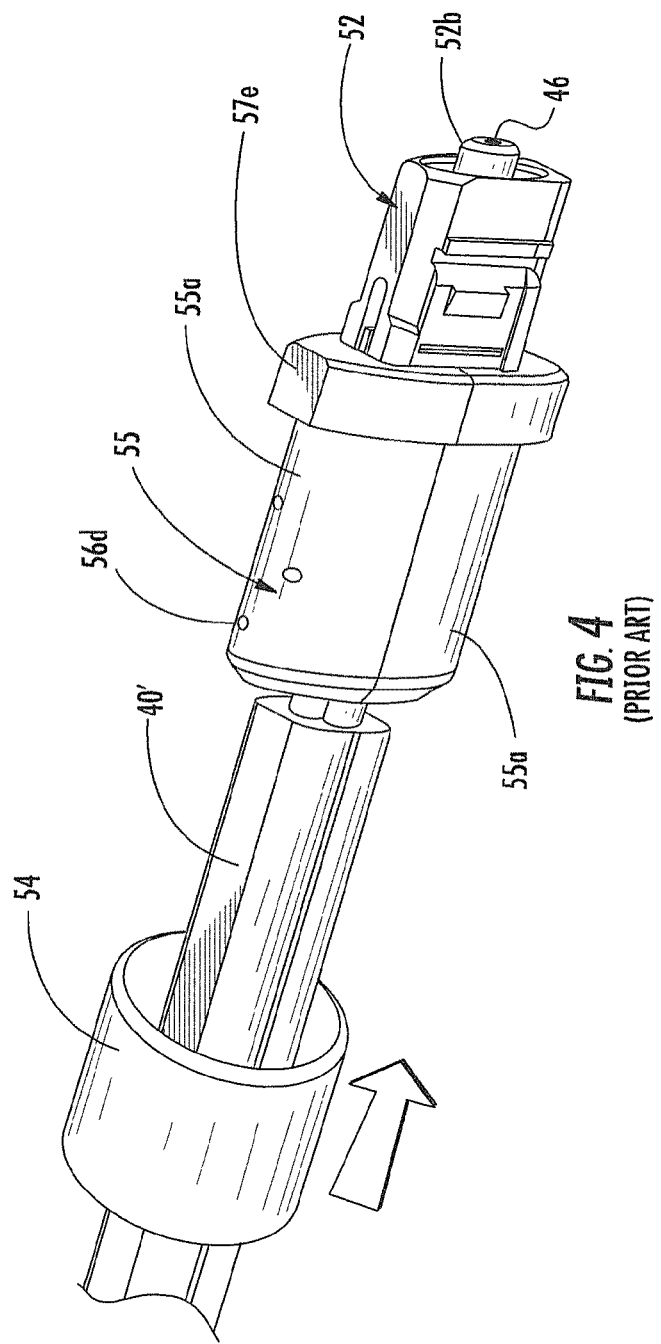
FIG. 4 shows the partially assembly crimp assembly being attached to the cable of the conventional prior art preconnectorized cable assembly of FIG. 3.

FIGS. 2-4 show further details of the conventional prior art preconnectorized cable assembly 10. FIG. 2 depicts an exploded view of conventional preconnectorized cable assembly 10 showing cable 40' as disclosed in U.S. Pat. No. 6,542,674 and the components of conventional hardened connector 50. Cable 40' is disclosed with an optional toning lobe, but other cables are possible. As best shown in FIG. 3, the prior art hardened connector 50 includes an industry standard SC type connector assembly 52 having a connector body 52a, a ferrule 52b in a ferrule holder (not numbered), a spring 52c, and a spring push 52d. Hardened connector 50 also includes a crimp assembly (not numbered) that includes a crimp housing having at least one half-shell 55a and a crimp band 54, a shroud 60 having an O-ring 59, a coupling nut 64, a cable boot 66, a heat shrink tube 67, and a protective cap 68 secured to boot 66 by a wire assembly 69.

FIGS. 3 and 4 depict partially assembled portions of conventional prior art preconnectorized cable assembly 10 showing the process of attaching the crimp assembly to cable 40'. FIG. 3 shows cable 40' having strength members 45 (not visible) cut flush with the stripped back jacket 48, thereby exposing the two GRP strength components 44 and optical component 42 from the end of cable 40'. The conventional connector assembly 52 can then be attached to the optical waveguide using an adhesive for securing the ferrule 52b to the optical waveguide before cleaving and polishing the ferrule/optical waveguide in the factory assembly process.

FIG. 5 is a perspective view of a cable assembly 100 comprising a hardened connector 150 comprising a mechanical splice connector assembly 152 according to the concepts of the present application. Hardened connector 150 is similar to the hardened connector shown in FIGS. 1-4, but uses a mechanical splice connector assembly 152 (FIG. 7) so the craft may terminate the hardened connector in the field such as on an end of a bulk cable. FIG. 5 depicts an assembled hardened connector 150 terminated to a fiber optic cable 140, which is similar to the fiber optic cable 40'.

Although hardened connector 150 is depicted as having a package with an OptiTap® connector footprint such as available from Corning Optical Communications LLC of Hickory, N.C. to explain the concepts, the concepts disclosed may have a package that uses any suitable hardened connector footprint such as a DLX footprint or a FastConnect footprint as desired by using different components for the hardened connector interface/package. FIGS. 5A and 5B respectively are partially-assembled rear perspective view and front perspective view of the cable assembly 100 of FIG. 5.

FIG. 6 shows a partially assembled perspective view of the hardened connector 150 as part of cable assembly 100 showing one shell 155a of an inner housing 155 formed by two shells (i.e., the two shells are the same part, but could be configured as two different parts) having a connector assembly receiving portion with an extended length cavity 157EC of the ferrule assembly of mechanical splice connector assembly may translate rearward as needed. The inner housing 155 with the connector assembly receiving portion 157 with the extended length that is sized so that the ferrule assembly of 170 of the mechanical splice connector assembly 152 has an extended rearward cavity so the ferrule assembly 170 has a space to translate when in an unmated state. The extended length cavity 157EC of the connector assembly receiving portion also provides a longer length for any buckling of the field optical waveguide 146 that may occur during translation upon mating with a complimentary device.

With continuing reference to FIG. 6, shell 155a includes a first end 155b with a cavity for securing the mechanical splice connector assembly 152 and a second end 155c with a cavity and shape that aids in securing the cable 140 and provides strain relief. Additionally, shell 155a includes a cable clamping portion at second end 155c and a connector assembly receiving portion 157 at first end 155b. As depicted, the connector assembly receiving portion 157 generally conforms with the profile of the mechanical splice connector assembly 152, but the connector assembly receiving portion with an extended length cavity 157EC at the rear allows for rearward movement of the ferrule assembly of the mechanical splice connector assembly as needed when mated with a complimentary device or connector.

FIG. 6A shows a partially assembled perspective view of another hardened connector for a cable assembly similar to FIG. 5 showing one shell 155a' of the inner housing that receives the ferrule assembly only when the cam 158 of the mechanical splice connector assembly 152 is in a clamping orientation within the extended length cavity 157EC. By allowing the cam 158 of mechanical splice connector to fit into the extended length cavity 157EC only when in the clamping position, it reduces the risk that the hardened connector is not assembled correctly by the user.

As best shown in FIG. 12, the inner housing 155 of the hardened connector 150 may be secured by a crimp band 154, but other suitable constructions are possible such as using an adhesive or the like. In this embodiment, inner housing 155 comprises two half-shells 155a that are held together by crimp band 154 once the cable assembly 100 having the hardened connector 150 is assembled. Inner housing 155 is configured for securing mechanical splice connector assembly 52 as well as providing strain relief to cable 140. The inner housing 155 may secure the connector body 152a of mechanical splice connector assembly 150 in any suitable manner and allow the ferrule assembly 170 to translate according to the concepts disclosed.

Although, the term half-shell is used, it is to be understood that it means suitable shells and includes shells that are greater than or less than half of the inner housing formed by shells 155a. Crimp band 154 is preferably made from brass, but other suitable crimpable materials may be used. This advantageously results in a relatively compact connector arrangement using fewer components. Moreover, the crimp band 154 allows the craft to assemble hardened connector 150 to cable 140 to be assembled quickly and easily in a familiar manner. Of course, other embodiments are possible according to the concepts disclosed such as using an adhesive for securing the shells together.

A longitudinal axis A-A is formed between first end 155b and second end 155c near the center of inner housing 155, through which a portion of a longitudinal passage is formed. When assembled, optical fiber 146 of cable 140 passes through the longitudinal passage and enters the mechanical splice connector assembly 152 for abutting the stub fiber 152c held in a bore of ferrule 152b.

In this embodiment, cable clamping portion 156 has two outboard half-pipe passageways 156a and a central half-pipe passageway 156b that is generally disposed along longitudinal axis A-A. Half-pipe passageways 156a and 156b preferably include at least one rib 156c for securely gripping or clamping optical component 142 and strength components 144 of cable 140 after crimp band 154 is crimped, thereby securing the components. Although, half-pipe passageways 156a and 156b are sized for the components of cable 140, the passageways can be sized for different cable configurations. Likewise, half-shell 155a has a connector assembly receiving portion 157 that is sized for attaching connector assembly 152. Specifically, connector assembly receiving portion 157 has a half-pipe passageway 157a that opens into and connects central half-pipe passageway 156b and a partially rectangular passageway for accommodating the connector housing. Half-pipe passageway is sized for securing components of the mechanical splice connector assembly 152. Rectangular passageway 157b receives a portion of connector body 152a therein and inhibits the rotation between connector assembly 152 and the inner housing 155. The inner housing 155 with the connector assembly receiving portion comprising extended length cavity 157EC may be sized for any suitable mechanical splice connector assembly such as an SC mechanical splice connector assembly similar to the OptiSnap® available from Corning Optical Communications LLC, however, any suitable mechanical splice connector assembly may be used such as LC, ST, FC, MT or the like.

FIG. 7 is a partially exploded view of an explanatory mechanical splice connector assembly 152 comprising a ferrule assembly 170 having a stub optical fiber 152c secured to a ferrule 152b that is used in hardened connector 150. Mechanical splice connector assemblies can have different designs, configurations and/or components for making a mechanical splice between a stub optical fiber secured to a ferrule and the field optical fiber inserted into the hardened connector 150.

In this embodiment, mechanical splice connector assembly 152 comprises a connector body 152a and a ferrule assembly 170. Ferrule assembly 170 comprises a ferrule 152b having a stub fiber 152c secured thereto and extending from the rear. The end face of the ferrule 152b and the fiber end are factory polished and the stub fiber 152*c* is used for making a mechanical splice with a field fiber that is inserted into the mechanical splice connector assembly 152 by the user. Alignment of the stub fiber 152*c* and the field fiber is accomplished using splice components 153 that are inserted into ferrule holder 154. The ferrule assembly of the mechanical splice connector assembly may use any suitable actuation member for aligning and securing the one or more splice components. Typically, the actuation member is moved from an open position for inserting the field optical fiber to a clamping position for aligning and securing the field optical fiber with the stub optical fiber. Actuation members may be one or more clamps, wedges, cams or the like for pushing the one or more splice components together for clamping the stub fiber in alignment with the field fiber for optical communication therebetween.

As depicted in the explanatory embodiment, a cam 158 having an eccentric profile on the through passageway is used for pushing the splice components 153 together after a field fiber is inserted into and aligned with the mechanical splice connector assembly 152. The mechanical splice connector assembly may also include a lead-in tube 151, a spring 156, a spring push 157 and a heat shrink (not numbered) for securing the fiber to the connector assembly as desired.

Figure 8:
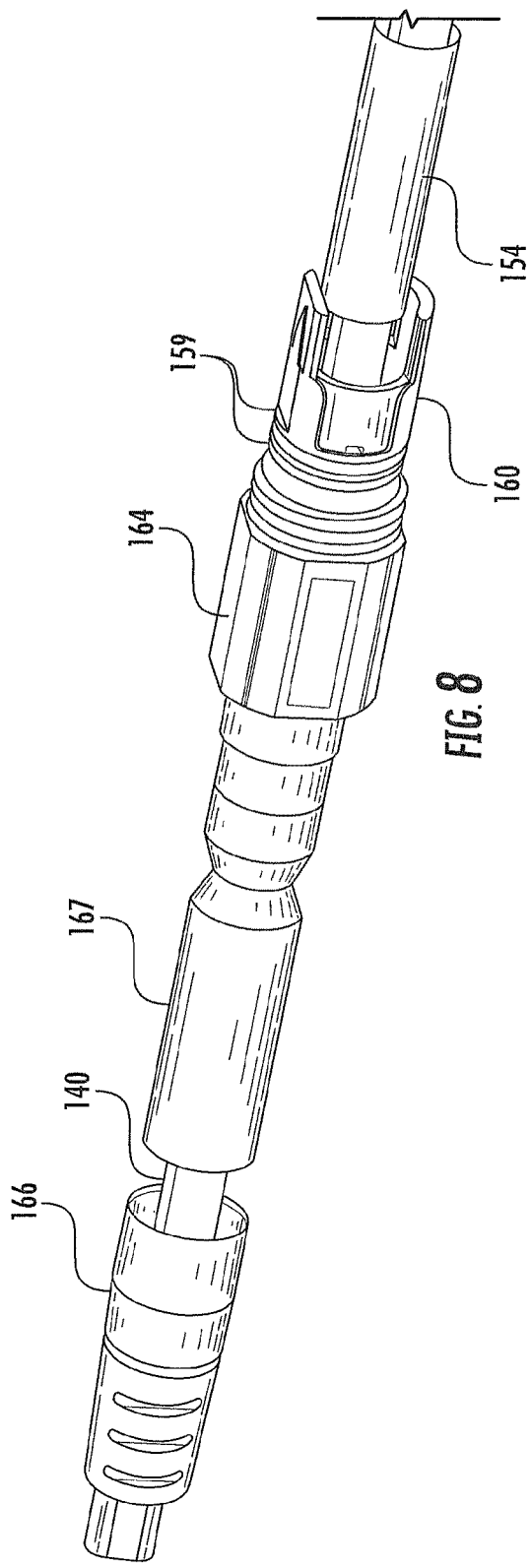

FIGS. 8-15 depict steps for assembling the hardened connector 150 on cable 140. FIG. 8 shows portions of hardened connector 150 slid onto the cable 140. Specifically, a crimp band 154, a shroud 160 having one or more O-rings 159, a coupling nut 164, a cable boot 166, and a heat shrink tube 167 are slid onto cable 140 as shown. Portions may be preassembled to simply installation for the user. For instance, the shroud 160, coupling nut 164, O-rings 159 and heat shrink tube 167 may be preassembled so that the user can easily slide the pre-assembled components onto the cable 140.

Figure 9:
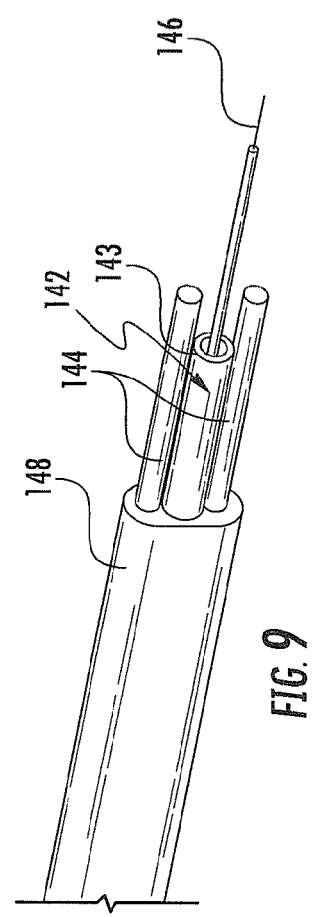

FIG. 9 depicts cable 140 prepared for termination by hardened connector 150 by stripping the cable jacket and cleaving the optical fiber. In this embodiment, cable 140 is a flat dielectric cable having an optical component 142 such as a buffer tube, at least one strength component 144, and a jacket 148. In this cable, strength components 144 are two glass-reinforced plastic (GRP) strength components and optical component 142 has an optical waveguide 146 disposed within a buffer tube 143. Cable 140 may also optionally include other components such as strength members to provide additional tensile strength, ripcords, toning element, etc. as desired. As used herein, the term "strength component" means the strength element has anti-bucking strength, while the term "strength member" means a strength element lacks anti-buckling strength. Furthermore, the term "tensile element" means either a strength component or a strength member. Cable 40 is an all-dielectric design, but other cables having conductive components such as steel strength components may be used with the disclosed concepts. Of course, other cables may be used with the concepts of the present invention. Moreover, other suitable mechanical splice connector assemblies may be used with suitable cables according to the concepts of the present invention, thereby resulting in numerous cable/connector combinations.

Cable 140 is prepared so that the optical waveguide 146, optical component 142, and strength components 144 extend a suitable length beyond the end of cable jacket 148 as shown in FIG. 9.

Figure 10:
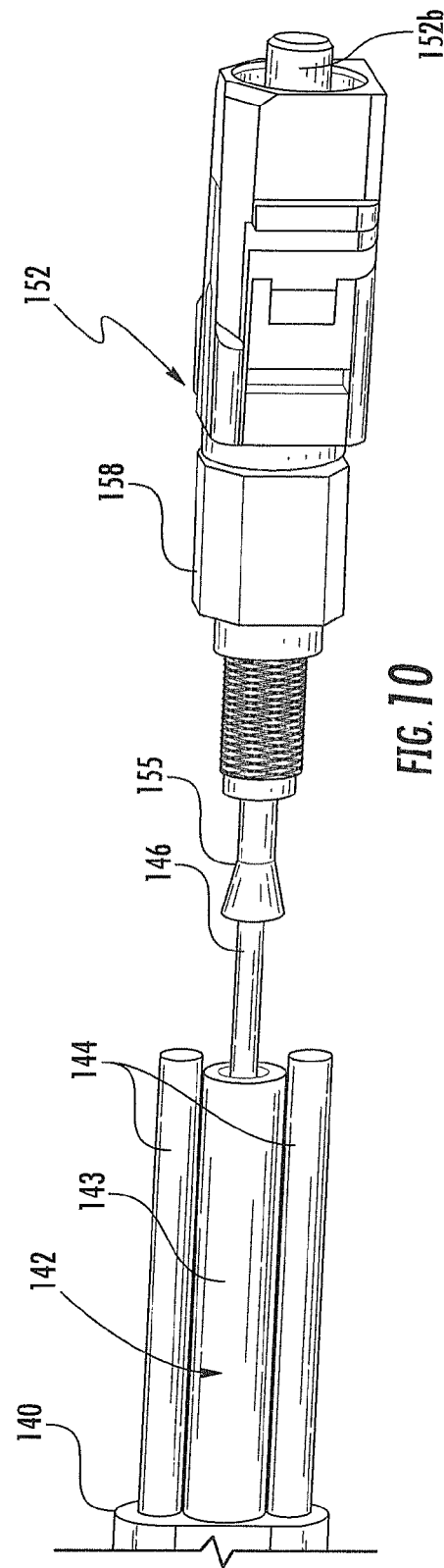

FIG. 10 depicts the optical waveguide 146 attached to the mechanical splice connector assembly 152. The cleaved optical waveguide 146 is inserted into the lead-in tube 155 of the mechanical splice connector assembly 152 until the optical waveguide 146 abuts the stub optical fiber 152*c*. Once properly aligned and positioned, the user can activate the splice assembly by rotating cam 158 in this embodiment of the mechanical splice connector assembly 152. Tools are available that can help the uninitiated attach a mechanical splice connector. By way of example, a user may use a Pretium OptiSnap installation tool to verify the optical performance of the mechanical splice. Some mechanical splice connector assemblies may have one or more translucent components such as a translucent splice parts 153, ferrule holder 154 and/or cam 158 for verifying the continuity of the splice. By way of explanation, a VFL tool launches visible light into the mechanical splice and when the visible light excessively scatters the light is leaking from the mechanical splice; however, when the glow diminishes the mechanical splice between the stub fiber and field-fiber is transmitting light at the splice point indicating a quality connection and lower splice losses at which point the mechanical splice may be secured.

FIG. 11 depicts the assembly of FIG. 10 having mechanical splice connector assembly 152 and cable 140 positioned in a first shell 155*a* of hardened connector 150. The alignment of the two shells 155*a* is accomplished by inserting pins 157*c* into complementary bores 157*d* between the two shells. FIG. 12 shows both shells 155*a* of inner housing 155 disposed about cable 140 before crimp band 154 is installed by deforming the crimp band 154 about inner housing 155. FIG. 12*a* depicts the connector body 152*a* secured to inner housing 155 for inhibiting movement of the same. In this embodiment, inner housing comprises a plurality of latches 155L that cooperate with complimentary openings (not numbered) on connector body 152*a*. More specifically, each shell 155*a* comprises a latch 155L and the connector body 152*a* has openings on opposite sides for securing the connector housing as shown, but other constructions are possible for securing the connector body 152*a* with the inner housing 155.

Crimp band 154 provides a robust attachment, but other attachment means could alternatively be used or additionally be used. For instance, shells may include one or more bores (not visible) that lead to one of half-pipe passageways 156*a* or 156*b*. Bores allow for inserting an adhesive, epoxy or the like into the inner housing 155, thereby providing a secure connection for strain relief.

Shells 155*a* may be symmetric only requiring one component or different right and left shells may be used as desired. FIG. 6 shows the inner surface of one shell 155*a*. In this case, only one shell 155*a* is used since the same symmetrical shells are used for both portions of inner housing 155. In other embodiments there may be a first shell and a second shell, which are different. For instance, one shell may have all of the alignment pins, rather than each shell having both alignment pins and bores.

Figure 13:
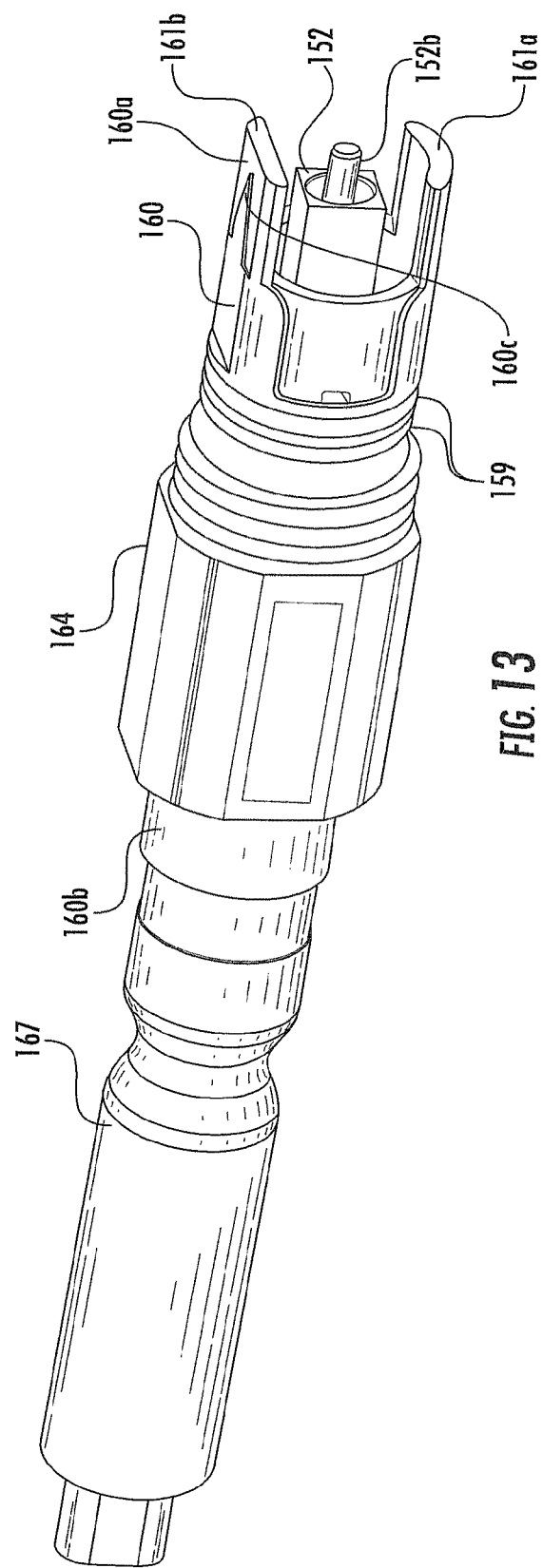
Figure 14:
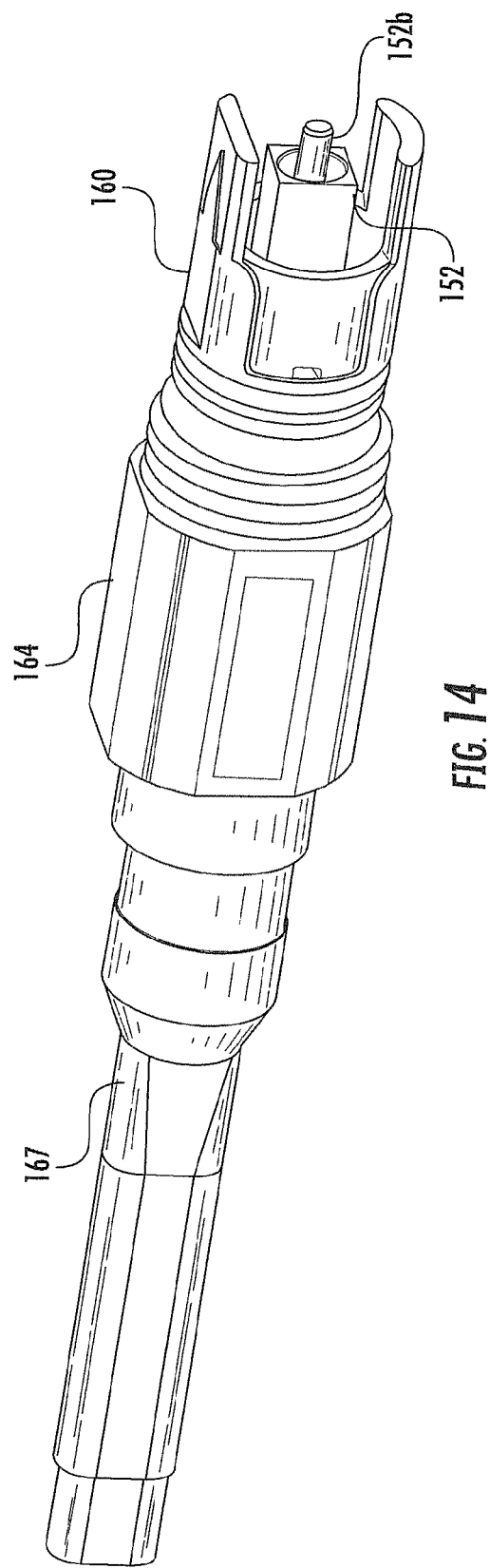

After the inner housing 155 is attached to the subassembly of FIG. 10, the inner housing assembly may mate with any suitable hardened connector package such as shroud 160. Shroud 160, coupling nut 164 and heat shrink 167 that were previously threaded onto cable 140 may be slid forward so that the inner housing is at least partially disposed in shroud 160 as shown in FIG. 13. Thereafter, the heat shrink may be applied for weatherproofing as shown in FIG. 14.

Additionally, inner housing 155 is keyed to direct the insertion of the assembly into shroud 160 as best shown in FIG. 5B. In this case, shells 155*a* include planar surfaces 157*e* (FIG. 6) on opposites sides of inner housing 155 at a first end 155b to inhibit relative rotation between inner housing 155 and shroud 160. In other embodiments, the inner housing may be keyed to the shroud using other configurations such as a complementary protrusion/groove or the like.

The hardened connector may optionally include other components as desired. By way of example, any suitable means may be used for retaining the coupling nut 164 in a forward position on the shroud 160 while still allowing rotation. For instance, a detent, snap ring or the like may be used for retaining the coupling nut to the shroud. FIG. 14A depicts a snap ring 163 disposed on a portion of the shroud 160. For instance, snap ring 163 may be disposed in a groove (not numbered) disposed on a portion of shroud 160 when assembled for seating the snap ring 163. Snap ring 163 may simplifying the assembly of the connector by allowing the sliding the coupling nut 164 over the shroud 160 until snap ring 163 seats in the groove to secure the coupling nut 164 while still allowing rotation about the shroud 160. Other embodiments may use a lanyard for a protective dust cap or the like for keeping the coupling nut 164 in a forward position. Further, components of the hardened connector pre-assembled for simplifying assembly of the hardened connector by the user. As depicted in FIG. 14B, one or more O-rings 159 and snap ring 163 are preassembled to the shroud 160. Pre-assembling the snap ring 163 with the shroud 160 also allows the coupling nut 164 and heat shrink 167 to be pre-assembled for easing final assembly of the hardened connector by user.

Returning to FIG. 13, shroud 160 has a generally cylindrical shape with a first end 160a and a second end 160b. Shroud generally protects front end of mechanical splice connector assembly 152 and in preferred embodiments also keys hardened connector 150 with the respective mating receptacle or device. Moreover, shroud 160 includes a through passageway between first and second ends 160a and 160b. As discussed, the passageway of shroud 160 is keyed so that inner housing 155 is inhibited from rotating when hardened connector 150 is assembled. Additionally, the passageway may have an internal shoulder (not numbered) that inhibits the inner housing from being inserted beyond a predetermined position.

First end 160a of shroud 160 includes at least one opening (not numbered) defined by shroud 160. The at least one opening extends from a medial portion of shroud 160 to first end 160a. In this case, shroud 160 includes a pair of openings on opposite sides of first end 160a, thereby defining alignment portions or fingers 161a, 161b. In addition to aligning shroud 160 with receptacle during mating, alignment fingers 161a, 161b may extend slightly beyond the ferrule end of mechanical splice connector assembly 152, thereby protecting the same. As shown, alignment fingers 161a, 161b may have different shapes so hardened connector 150 and its complimentary device 30 only mate in one orientation. In preferred embodiments, this orientation is marked on shroud 160 using alignment indicia 160c so that the craftsman can quickly and easily mate the hardened connector. In this case, alignment indicia 160c is an arrow molded into the top alignment finger of shroud 160, however, other suitable indicia may be used. Then, the arrow may be aligned with complimentary alignment indicia disposed on the complimentary device so that alignment fingers 161a, 161b have the proper orientation during mating. Thereafter, the craftsman engages the external threads of coupling nut 164 with the complimentary internal threads for making the optical connection.

As depicted in FIGS. 5A and 10, a major axis of the fiber optic cable 140 is arranged in a generally vertical orientation with respect to the longitudinal symmetrical plane of mechanical splice connector assembly 152. The major axis of fiber optic cable 140 is also oriented to generally pass through the alignment portions or fingers 161a, 161b of shroud 160. Inner housing 155 may have a round portion at the rear portion 155r and is keyed at a front portion 155f to allow rotation of the inner housing 155 when locating the proper keying to shroud 160. FIG. 5B depicts the complementary protrusion 155p of inner housing 155 engaging the respective groove 169 of the shroud 160 for orienting the mechanical splice connector assembly 152 with the different shaped alignment fingers 161a, 161b of shroud 160.

In this case, the mating between the hardened connector and the receptacle is secured using a threaded engagement, but other suitable means of securing the optical connection are possible for other hardened packages. For instance, the securing means for the hardened connector may use a quarter-turn lock, a quick release, a push-pull latch, or a bayonet configuration as desired.

A medial portion of shroud 160 has one or more groove (not numbered) for seating one or more O-rings 159. O-ring 159 provides a weatherproof seal between hardened connector 150 and a complimentary device such as a receptacle or protective cap. The medial portion also includes a shoulder 160d that provides a forward stop for coupling nut 164. Coupling nut 164 has a passageway sized so that it fits over the second end 160b of shroud 160 and easily rotates about the medial portion of shroud 160. In other words, coupling nut 164 cannot move beyond shoulder 160d, but coupling nut 64 is able to rotate with respect to shroud 60. Second end 160b of shroud 160 may also include a stepped down portion having a relatively wide groove. This stepped down portion and groove may be used for securing heat shrink tubing 167. Heat shrink tubing 167 is used for weatherproofing the hardened connector to the cable.

Figure 15:
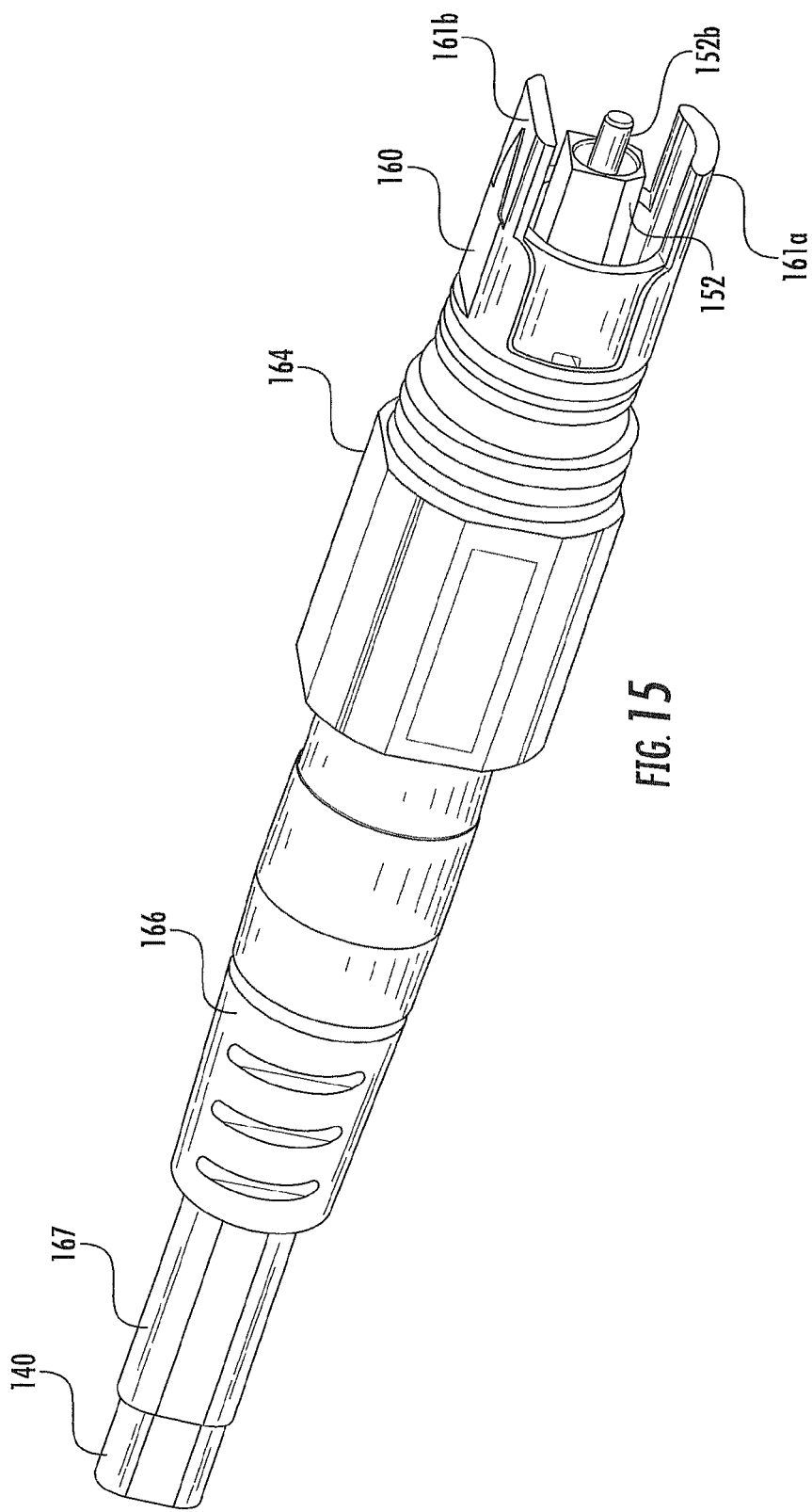

After the heat shrink tubing 167 is attached, boot 166 is slid over heat shrink tubing 67 and a portion of shroud 160 as shown in FIG. 15. Boot 166 is preferably formed from a flexible material such as KRAYTON. Heat shrink tubing 167 and boot 166 provide bending strain relief to the cable near hardened connector 150. Boot 166 has a longitudinal passageway (not visible) with a stepped profile therethrough. The first end of the boot passageway is sized to fit over the second end of shroud 160 and heat shrink tubing 167. The first end of the boot passageway has a stepped down portion sized for cable 140.

Generally speaking, most of the components of hardened connector 150 are formed from a suitable polymer. Preferably, the polymer is a UV stabilized polymer such as ULTEM 2210 available from Sabic; however, other suitable materials are possible. For instance, stainless steel or any other suitable metal may be used for various components.

The described explanatory embodiment provides an optical connection that can easily be made in the field by the user. Additionally, the optical connection of the hardened connector 150 is easily connected or disconnected by merely mating or unmating the hardened connector 150 with the respective receptacle or other device by threadly engaging or disengageing coupling nut 164. Thus, the hardened connector of the present application allow deployment of optical waveguides toward the subscriber or other locations in an easy and economical manner, without having to store cable slack or cut and throw away cable. Furthermore, the concepts disclosed may be practiced with other fiber optic cables, connectors and/or other mechanical splice connector assembly configurations.

By way of example, FIGS. 16 and 17 depict another fiber optic cable 140' that may be used with the hardened connector 150. Specifically, FIG. 16 shows a cable 140' prepared for connectorization and FIG. 17 shows strength members 143 such as aramid yarns being positioned about outer barrel 155O of inner housing 155 before installing crimp band 154. Of course other techniques are possible for securing strength members 143, but using this technique allows one configuration of inner housing 151 to accommodate several different types of cables. Thereafter, the assembly of hardened connector 150 is completed in a similar manner as disclosed herein.

Hardened connectors may also terminate more than one optical waveguide. A plurality of optical waveguide can be arranged loosely, disposed in a ribbon, or bundlized. For instance, a cable may have more than one optical waveguide therein. An inner housing suitable for securing more than one mechanical splice connector assembly is possible. Likewise, the shells of inner housing may be non-symmetrical to handle other cable designs. Furthermore, inner housings may hold one or more multi-fiber ferrules.

Additionally, the hardened connectors may also have electrical power components that are connected and disconnected through the hardened connector.

Still other variations of hardened connectors are possible according to the concepts disclosed herein. By way of explanation, hardened connectors may also include features for influencing the location of fiber bow or buckling when the ferrule assembly of the mechanical splice connector assembly moves rearward. Hardened connectors may also include features or components for sealing the cable to the connector or providing cable strain relief. Still further, hardened connectors may comprise a pre-assembly of components for ease of installation/termination of the hardened connector by the user.

FIG. 18 depicts is a top view of another explanatory cable assembly 100' similar to cable assembly 100. Cable assembly 100' comprises another hardened connector 150 comprising a mechanical splice connector assembly 152 (not visible in FIG. 18) that is similar the hardened connector 150 of FIG. 5 using some similar components, but also uses some different components. Like the hardened connector 150 of FIG. 5, the hardened connector 150 of FIG. 18 allows the user to terminate the hardened connector 150 in the field such as on an end of a bulk cable such as cable 140 for providing a tailored cable length for the cable assembly. Moreover, the hardened connector of FIG. 18 allows the user the flexibility of using other fiber optic cable designs with the connector as desired by changing one or more components or termination techniques.

FIG. 19 is a partially exploded view of an explanatory cable assembly 100' similar to FIG. 18 comprising hardened connector 150 with a mechanical splice connector assembly 152 similar to the mechanical splice connector assembly shown in FIG. 7. Cable assembly 100' also comprises fiber optic cable 140 that can be terminated to mechanical splice connector assembly 152 by a user in the field. However, the hardened connector 150 is adaptable for use with other cables as desired.

Hardened connector 150 of FIG. 19 comprises an inner housing 255 that is similar to inner housing 155. Inner housing 255 comprises at least two shells 255a, 255b having a longitudinal passageway (not numbered) for passing at least one optical waveguide 12 therethrough from a first end 155b to a second end 155c, at least one cable clamping portion at second end 155c, and a connector assembly receiving portion 157 at a first end 155b, and the connector assembly receiving portion 157 comprises an extended length cavity 157EC. The connector assembly receiving portion 157 generally conforms with the profile of the mechanical splice connector assembly 152, and the connector assembly receiving portion 157 has an extended length cavity 157EC at the rear allowing for rearward movement of the ferrule assembly 170 of the mechanical splice connector assembly as discussed herein. Hardened connector 150 also comprises mechanical splice connector assembly 152. Mechanical splice connector assembly 152 comprises connector body 152a and a ferrule assembly 170 having stub optical fiber 152c secured to ferrule 152b and may have any suitable configuration as discussed.

When assembled, a portion of the mechanical splice connector assembly 152 is secured to the inner housing 255 so that the ferrule assembly 170 of the mechanical splice connector assembly 152 can move rearward into the extended length cavity 257EC when displaced rearward such as during mating with a complimentary connector. Mechanical splice connector assembly 152 may include the other features/components as discussed herein.

Hardened connector 150 of FIG. 19 also comprises a crimp band 154 for holding the two shells 255a, 255b together when assembled, a shroud 260 similar to shroud 160, a coupling nut 164, a cable sealing element 210, a pusher 220, a rear nut 230 and a cable bend relief 240. However, other embodiments of hardened connector 150 are possible and may use fewer or more components as desired. Other variations of the components for the hardened connector 150 are also possible according to the concepts disclosed. By way of explanation, hardened connectors 150 may use other cable sealing elements for different cable types or profiles.

FIG. 20 is a longitudinal sectional view of the cable assembly 100' depicted in an assembled state. As depicted, first shell 255a and second shell 255b cooperate to form a bow zone BZ along the longitudinal passage formed by inner housing 255. More specifically, first shell 255a comprises a bow geometry BG for aiding the initiation of a bow in the optical waveguide 146 as needed, and second shell 255b comprises a bow cavity BC for providing a space for the bow in optical waveguide 146 to occupy. Inner housing 255 also includes an extended length cavity 257EC at the rear allowing for rearward movement of the ferrule assembly 170 of the mechanical splice connector assembly 152. Further, cam 158 of mechanical splice connector 152 may be allowed to only fit into the extended length cavity 157EC only when in the clamping position for securing the optical waveguide 146, thereby reducing the risk that the hardened connector 150 is not assembled correctly by the user.

Bow zone BZ provides a suitable cavity for an optical waveguide 146 of fiber optic cable 140 to bow and move without making significant contact with an inner surface of the longitudinal passageway of inner housing 255. Further, the bow zone BZ can provide a slight pre-bow for influencing the location of the bow and the bow profile as the optical waveguide 146 as the ferrule assembly of the mechanical splice connector assembly moves rearward during mating. Consequently, the optical performance of the optical waveguide 146 may be preserved. By way of example, the bow zone BZ may have a length in the range of 15-22 millimeters, but other lengths may be possible as well.

By way of explanation, first shell 255a comprises a bow geometry BG with a profile designed to initiate a bow in the optical waveguide 146 when in the relaxed state to influence the formation of the fiber bow, and second shell 255b comprises a bow cavity BC for providing a space for the fiber bow to occupy without having undue contact with the longitudinal passageway of inner housing 255. For instance, the bow geometry BG may be a bow ramp that projects toward the longitudinal axis A-A of the inner housing for initiating a bow in optical waveguide 146. In one explanatory embodiment, the bow ramp extends to the longitudinal axis A-A of the inner housing 255. Further, the bow ramp may be curvilinear so that no sharp surfaces are present.

FIGS. 21 and 22 are perspective views of first shell 255a and second shell 255b showing internal details of the respective shells. FIGS. 23A and 23B are close-up perspective views of the first shell 255a and FIGS. 24A and 24B are close-up perspective views of the second shell 255b. With continuing reference to FIGS. 21 and 22, shells 255a, 255b include respective first ends 155b with cavity for securing the mechanical splice connector assembly 152 and respective second ends 155c with a cavity and shape that aids in securing the cable 140 and for providing strain relief to the cable when assembled. Specifically, shells 255a, 255b comprise a cable clamping portion at second ends 155c and connector assembly receiving portions 157 at first ends 155b. As depicted, the connector assembly receiving portion 157 generally conforms with the profile of the mechanical splice connector assembly 152, but the connector assembly receiving portion with an extended length cavity 157EC at the rear allows for rearward movement of the ferrule assembly of the mechanical splice connector assembly 152 as needed when mated with a complementary connector.

Inner housing 255 may comprise one or more latches 255R (FIG. 21) that cooperate with complimentary openings or features (not numbered) on connector body 152a. More specifically, shells 255a each comprise a latch 255R and the connector body 152a has openings on opposite sides for securing the connector housing as best shown in FIG. 28, but other constructions are possible for securing the connector body 152a with the inner housing 255.

FIGS. 25 and 26 are close-up perspective views of a rear portion of the second shell 255a and a prepared cable 140 placed into the rear portion of the second shell, respectively. Shells may have any suitable shape/geometry to accommodate the desired cable configuration. In this embodiment, cable clamping portion 156 has two outboard half-pipe passageways 156a and a central half-pipe passageway 156b that is generally disposed adjacent to longitudinal axis A-A. Half-pipe passageways 156a and 156b may include at least one rib (not visible) for securely gripping or clamping optical component 142 and strength components 144 of cable 140 after crimp band 154 is crimped, thereby securing the components. Although, half-pipe passageways 156a and 156b are sized for the components of cable 140, the passageways can be sized for different cable configurations. Likewise, shells 255a, 255b comprises connector assembly receiving portion 157 that is sized for attaching connector assembly 152 as discussed herein. The inner housing 255 with the connector assembly receiving portion comprising extended length cavity 157EC may be sized for any suitable mechanical splice connector assembly and may be used with multifiber mechanical splice connector assemblies as desired.

FIG. 27 is a top view showing a partially assembled hardened connector 150 having the second shell 255b and a prepared fiber optic cable 140 with its mechanical splice connector assembly 140 attached placed into the second shell. The shells 255a, 255b of the inner housing 255 may be configured to receive the ferrule assembly only when the cam 158 of the mechanical splice connector assembly 152 is in a clamping orientation within the extended length cavity 157EC. By allowing the cam 158 of mechanical splice connector to fit into the extended length cavity 157EC only when in the clamping position, it reduces the risk that the hardened connector is not assembled correctly by the user. Longitudinal axis A-A is formed between first end 155b and second end 155c near the center of inner housing 255, through which a portion of a longitudinal passage is formed. When assembled as best shown in FIG. 26, optical fiber 146 of cable 140 passes through the longitudinal passage and enters the mechanical splice connector assembly 152 for abutting the stub fiber 152c held in a bore of ferrule 152b.

FIG. 28 is a perspective view showing the first shell 255a holding the prepared cable 140 with its mechanical splice connector assembly 152 attached and ready to have second shell 255b placed upon about the sub-assembly. As depicted, the connector body 152a is secured to the first shell 255a by latches 255R. As second shell 255b is aligned and placed onto first shell 255a, alignment arms 255AA of second shells cooperate with alignment channels 255AC for securing the respective first ends 155b of the shells 255a, 255b (best shown in FIGS. 23B and 24B). When the shells 255a, 255b are placed together a small gap G (FIG. 37C) exists between the shells at a rear portion so that the shells can be pushed together and clamp onto the tensile elements 144 such as glass-reinforced plastic (GRP) members for strain-relieving the cable 140 to the inner housing 255.

FIG. 29 is a perspective view showing the first shell 255a and second shells 255b disposed about the prepared cable 140 and the crimp band 154 (which was previously threaded onto cable 140) positioned on a rearward portion of the inner housing 255 before being crimped for securing the shells.

FIG. 30 is a longitudinal sectional view showing the first and second shells 255a, 255b disposed about the prepared cable 140 and depicting the bow zone BZ. FIG. 30 also depicts a portion of a transverse bore B formed by shells 255a, 255b (also see FIG. 29). Transverse bore B acts as a demarcation location for the optical waveguide 146 as it passes into the bow zone BZ. The transverse bore b also provides a flex location for the cable clamping region for the inner housing 255 where the crimp band 154 may deflect rearward portions of the shells 255a, 255b together when deformed for providing cable strain relief between the cable and the hardened connector 150 as discussed in more detail below. Hardened connectors may also optionally include an insert 250 disposed between cable 140 and the rear portions of inner housing 255 for inhibiting damage to the inner housing 255 or providing a secure grip onto the cable 140 when deforming crimp band 154. Insert 250 may be formed from any suitably hard material such as a metal or hard polymer.

FIGS. 31 and 32 are close-up rear perspective views of a portion of shroud 260, cable sealing element 210 and a pusher 220 in an unassembled state and an assembled state, respectively. The components act to aid in sealing the cable entry into the rear portion of hardened connector 150. Generally speaking, the cable sealing element 210 has a passageway 210P for receiving cable 140 therethrough and is deformed between the rear end of shroud 260 and the pusher 220 when fully-seated for sealing the cable entry.

To accomplish the sealing, cable sealing element 210 is formed from a suitable material and geometry so that is adequately seals about the cable over the desired temperature range when sufficiently deformed. By way of example, for outdoor applications the desired temperature range for sealing may be −40 to 75° C.; however, other suitable temperature ranges are possible such as for an indoor rated connector or a high-temperature rated connector.

Examples of materials for the cable sealing element 210 may be silicone or other rubber-like sealing materials that may be suitably elastic and have the desired material properties. For instance, it may be desirable to choose a material for the cable sealing element 210 that has a suitable low-compression set and flexibility over a wide range of temperatures. Porosity of the cable sealing element material or other features may provide other desirable features to maintain the sealing over the desired temperature range and lifespan of the hardened connector.

In this embodiment, shroud 260 has a chambered end 260C that receives cable sealing element 210 therein along with a longitudinal passageway (not numbered) for receiving the cable 140 therethrough. The longitudinal passageway of shroud 260 may have a shape that is tailored to the outer profile of the cable 140 to aid in the area that must be sealed. Chambered end 260C has a threaded portion 260T with a plurality of flat portions 260F; however, other variations are possible. Each flat portion 260F of shroud 260 has a lug or protrusion 260L that cooperates with the latch or window 220L on pusher 220 for aligning and initial engagement of the pusher 220 with the rear portion of the shroud 260.

Pusher 220 comprises a longitudinal passageway 220P for receiving cable 140 therethrough. Longitudinal passageway 220P may be tailored to the outer profile of cable 140 as desired. Pusher 220 also has one or more arms 220A that cooperate with shroud 260. Pusher 220 also includes a protrusion portion 220P that extends into the chambered end 260C of shroud 260. Consequently, when assembled, the cable sealing element 210 is trapped between the chambered end 260C and the protrusion portion 220P that is snap-fitted to shroud 260 using the engagement between the latch 220L on pusher 220 and the lugs 260L on shroud 260 as depicted in FIG. 32. The geometry and materials can be advantageously selected so that the cable 140 may still be easily inserted through the pusher 220, cable sealing element 210 and shroud 260 during initial engagement as shown in FIG. 32, but still provide adequate sealing when the pusher is fully-engaged during assembly.

FIG. 33 is a perspective view of another cable sealing element 210' with passageway 210P that may be used with hardened connector 150 for sealing cable 140. Hardened connector 150 may accommodate other cable profiles or types by using cable sealing elements with passageways having other shapes or outer profiles for cable sealing. Likewise, the passageway of the pusher 220 or the rear passageway of shroud 260 may be modified to accommodate other cable profiles or types as desired. Further, the geometry of the protrusion portion 220P of pusher 220 and/or the geometry of the chambered portion 260C of shroud 260 may be modified for other cable profiles of types as desired. By way of explanation, the geometry or shapes could be adapted for sealing a round cable using the components. Further, round cables could have other constructions for securing tensile elements such as aramid yarns such as securing at least one of the plurality of tensile elements of the cable between an outer barrel formed by the at least two shells and a crimp band such as depicted in FIG. 17.

Using the cable sealing element 210, pusher 220 and shroud 260 advantageously allows pre-assembling a plurality of components for use in a bag of parts for the hardened connector, thereby simplifying the assembly of the connector by the user. FIGS. 34A-34C are perspective views depicting a pre-assembly of a plurality of parts for forming a pre-assembly of components 300 (FIG. 34C) for hardened connector 150, thereby allowing the user to quickly and easily terminate a cable to the connector using the pre-assembly of components 300. FIG. 34D is a partial sectional view of the pre-assembly of components 300 of FIG. 34C showing the arrangement of the pre-assembly components with cable attached 140 thereto and cable sealing member 210 deformed by pusher 220.

FIG. 34A depicts an exploded view of an explanatory pre-assembly of components 300. Other pre-assembly of components according the concepts disclosed may include fewer or more components as desired or have different constructions. FIG. 34B depicts the O-ring 159 and coupling nut 164 attached to the shroud 260 as depicted. Coupling nut 164 may use a keeper such as a snap-ring or the like to inhibit it from sliding rearward while still allowing rotation of the coupling nut 164 about the shroud 260 for engaging the threads with a complimentary device such as a receptacle or the like. If used, the snap-ring could sit in an appropriate sized and positioned groove in the shroud and cooperate with the coupling nut 164. FIG. 34B also shows that cable sealing element 210 can be positioned at the rear end of shroud 260 and then pusher 220 may be attached to the rear end of shroud 260. Thereafter, rear nut 230 having an internal threaded portion (FIG. 34D) can be loosely attached to the rear end of shroud 260 by engaging threads 260T disposed on shroud, thereby forming the pre-assembly of components 300. By loosely threading rear nut 230 onto shroud 260, the cable sealing element 210 is not appreciably deformed so that the cable 140 may be easily threaded onto cable 140 for quick assembly and termination by the user. FIG. 34D depicts rear nut 230 fully-seated to pusher 220 until a shoulder 230S of rear nut 230 contacts pusher 220 inhibiting further tightening of rear nut 230, thereby deforming cable sealing element 210 so that a suitable cable seal is formed. Consequently, the user can adequately seal the cable 140 to hardened connector 150 without the use of an epoxy or other like material, thereby making the field-termination of hardened connector quick, simple and reliable. Pusher 220 may comprise a reverse-funnel geometry at the rear portion as represented by the dashed lines depicted in FIG. 34D for cable bend-relief; however, other structures or components are also possible for providing cable bend-relief at the rear of the hardened connector.

Illustratively, FIG. 35 is a top view of another explanatory cable assembly 100'' with hardened connector 150 similar to FIG. 18 that further includes a boot 166 made of a suitable material for providing cable bend-relief. FIGS. 36A and 36B are longitudinal sectional views of the cable assembly 100'' showing the details of the design, which is similar to cable assembly 100'.

Also disclosed are methods of terminating hardened connectors 150 according to the concepts disclosed. FIGS. 37A-37E are perspective views showing the assembly steps of the cable assembly of FIG. 35. The necessary parts of the hardened connector may be threaded onto the cable 140 in the correct order. As shown in FIG. 37A, boot 166, pre-assembled components 300 and crimp band 154 are threaded onto cable 140. The end portion of cable 140 is prepared for attachment to a mechanical splice connector assembly 152 as known in the art such as by removing a suitable portion of the cable jacket 148 to expose the tensile elements 144 and optical waveguide 146 of the cable 140 as depicted. Once exposed, the optical waveguide 146 may be stripped of its coatings and cleaved to an appropriate length for the desired mechanical splice connector assembly 152. FIG.

37B depicts the mechanical splice connector assembly 152 after being optically coupled to the optical waveguide 146 of cable 140 for making the mechanical splice between optical waveguide 146 and the stub fiber 152c of the mechanical splice connector assembly 152. FIG. 37C depicts the cable 140 and mechanical splice connector assembly 152 attached to the inner housing 255 comprising shells 255a, 255b.

FIG. 37D depicts the crimp band 154 being slid forward about the rear portion of inner housing 255 and being secured thereto by being deformed. In this embodiment, deforming the crimp band 154 pushes the rear portions of the shells 255a,255b together for squeezing the rear portions of the shells 255a,255b together about and closing the gap G, thereby clamping the shells to the tensile elements 144 of cable 140 such as GRP strength components, thereby strain-relieving the cable 140 to the inner housing 255. Thereafter, the pre-assembly of components 300 may be slid forward onto the inner housing 255 as depicted in FIG. 37E. In this embodiment, shroud 260 comprises a structure for securing the inner housing 255 with shroud 260 for inhibiting excessive movement. Specifically, shroud 260 comprises one or more securing features 260W that secure the inner housing 255 to the shroud 260 (or the pre-assembly of components 300 including shroud 260). More specifically, inner housing 255 has inner housing locking feature 255L that are secured cooperate with securing feature 260W such as windows as depicted; however other geometries for securing the inner housing 255 with shroud 260 are possible. After sliding the pre-assembly of components 300 forward to secure it to the shroud, the rear nut 230 is still loosely engaged and does not significantly deform the cable sealing element 210. Consequently, the rear nut 230 can be threaded tighter onto shroud 260 advancing pusher 220 forward until the cable sealing element 210 is adequately deformed. FIG. 37F is a sectional view showing the rear nut 230 tightened onto shroud 260 showing the advancement of the pusher 220 to deform the cable sealing element 210 about the cable 140, thereby sealing the cable 140 to the hardened connector 150.

Many modifications and other embodiments of the present invention, within the scope of the appended claims, will become apparent to a skilled artisan. Additionally, the present invention can include other suitable configurations, hybrid designs, structures and/or equipment. Therefore, it is to be understood that the invention is not limited to the specific embodiments disclosed herein and that modifications and other embodiments may be made within the scope of the appended claims. Although specific terms are employed herein, they are used in a generic and descriptive sense only and not for purposes of limitation. The invention has been described with reference to drop cables having FTTx applications, but the concepts disclosed are applicable to other suitable applications.

That which is claimed:

1. A hardened connector, comprising:
   an inner housing comprising at least two shells, the at least two shells having a longitudinal passageway for passing at least one optical waveguide therethrough, at least one cable clamping portion, and a connector assembly receiving portion, and the connector assembly receiving portion comprises an extended length cavity;
   a mechanical splice connector assembly, the mechanical splice connector assembly comprises a connector body and a ferrule assembly having a stub optical fiber secured to a ferrule, wherein a portion of the mechanical splice connector assembly is configured for securing to the inner housing so that the ferrule assembly of the mechanical splice connector assembly can move rearward into the extended length cavity when displaced rearward when assembled;
   a shroud, wherein a portion of the at least two shells is disposed within the shroud;
   a cable sealing element and a pusher for deforming the cable sealing element against an end of the shroud; and
   a rear nut for coupling to the end of the shroud such that the pusher and the cable sealing element are positioned between the rear nut and the shroud when assembled.

2. The hardened connector of claim 1, the mechanical splice connector assembly comprising one or more splice parts disposed in a ferrule holder.

3. The hardened connector of claim 1, the mechanical splice connector assembly comprising a cam.

4. The hardened connector of claim 3, the connector assembly receiving portion of the at least two shells shaped to receive the cam of the mechanical splice connector only when the cam is in a clamping orientation.

5. The hardened connector of claim 1, the mechanical splice connector assembly comprising one or more translucent components.

6. The hardened connector of claim 1, the inner housing comprising at least one latch for securing the connector body.

7. The hardened connector of claim 1, wherein a portion of the at least two shells comprises a bow zone.

8. The hardened connector of claim 7, the bow zone further comprising a bow geometry that projects toward a longitudinal axis A-A of the inner housing.

9. The hardened connector of claim 1, the shroud and the shroud has a keyed passageway for inhibiting rotation between the shroud and the at least two shells when assembled.

10. The hardened connector of claim 1, wherein the shroud comprises a first finger and a second finger, and the shroud has a keyed passageway for orientating the connector housing in a predetermined orientation relative to the first finger and second finger when assembled.

11. The hardened connector of claim 1, further including a crimp band for holding the at least two shells together.

12. The hardened connector of claim 1, further-comprising a coupling nut for removably attaching the at least one hardened connector.

13. The hardened connector of claim 1, the shroud defining at least one opening of a first end, the at least one opening extending lengthwise from a medial portion of the shroud to the first end of the shroud, wherein the ferrule is accessible within the first end of the shroud when assembled.

14. The hardened connector of claim 13, the at least one opening defining a pair of openings disposed on opposites sides of the shroud.

15. The hardened connector of claim 1, further comprising a pre-assembly of components.

16. The hardened connector of claim 1, further comprising a snap ring disposed on a portion of a shroud.

17. The hardened connector of claim 1, wherein the shroud has at least one alignment indicia for indicating a mating orientation.

18. The hardened connector of claim 1, wherein the shroud includes a first finger and a second finger for mating, and the first finger and the second finger have different cross-sectional shapes for keying the hardened connector.

19. The hardened connector of claim 1, further comprising a protective cap.

20. The hardened connector of claim 1 being attached to a fiber optic cable, the cable further including a first strength component and a second strength component.

21. The hardened connector of claim 1 being attached to a fiber optic cable and further comprising a heat shrink tube for weatherproofing the cable, the heat shrink tube being disposed over a portion of the at least one hardened connector and a portion of a cable jacket.

22. The hardened connector of claim 1 being attached to a fiber optic cable, the at least one cable clamping portion securing at least one of the plurality of tensile elements of the cable between an outer barrel formed by the at least two shells and a crimp band.

23. The hardened connector of claim 1, wherein the shroud includes a first finger and a second finger for mating with a complementary receptacle, wherein the first finger and the second finger are disposed about 180 degrees apart and have different cross-sectional shapes for keying the hardened connector.

24. The hardened connector of claim 1, a plurality of the components of the at least one hardened connector being formed from a UV stabilized material.

25. A hardened connector, comprising:
an inner housing comprising at least two shells, the at least two shells having a longitudinal passageway for passing at least one optical waveguide therethrough, at least one cable clamping portion, and a connector assembly receiving portion, and the connector assembly receiving portion comprising an extended length cavity, wherein a portion of the at least two shells comprises a bow zone;
a mechanical splice connector assembly, the mechanical splice connector assembly comprises a connector body and a ferrule assembly having a stub optical fiber secured to a ferrule and one or more splice parts disposed in a ferrule holder, wherein a portion of the mechanical splice connector assembly is configured for securing to the inner housing so that the ferrule assembly of the mechanical splice connector assembly can move rearward into the extended length cavity when displaced rearward when assembled;
a shroud, wherein a portion of the at least two shells is disposed within the shroud;
a cable sealing element and a pusher for deforming the cable sealing element against an end of the shroud; and
a rear nut for coupling to the end of the shroud such that the pusher and the cable sealing element are positioned between the rear nut and the shroud when assembled.

26. The hardened connector of claim 25, the mechanical splice connector assembly comprising a cam.

27. The hardened connector of claim 25, the connector assembly receiving portion of the at least two shells shaped to receive the cam of the mechanical splice connector only when the cam is in a clamping orientation.

28. The hardened connector of claim 25, the mechanical splice connector assembly comprising one or more translucent components.

29. The hardened connector of claim 25, the inner housing comprising at least one latch for securing the connector body.

30. The hardened connector of claim 25, the bow zone further comprising a bow geometry that projects toward a longitudinal axis A-A of the inner housing.

31. The hardened connector of claim 25, further comprising a snap ring disposed on a portion of a shroud.

32. The hardened connector of claim 25, wherein the shroud has a keyed passageway for inhibiting rotation between the shroud and the at least two shells when assembled.

33. The hardened connector of claim 25, wherein the shroud comprises a first finger and a second finger, and the shroud has a keyed passageway for orientating the connector housing in a predetermined orientation relative to the first finger and second finger when assembled.

34. The hardened connector of claim 25, further including a crimp band for holding the at least two shells together.

35. The hardened connector of claim 25, further comprising a coupling nut for removably attaching the at least one hardened connector.

36. The hardened connector of claim 25, the shroud defining at least one opening of the first end, the at least one opening extending lengthwise from a medial portion of the shroud to the first end of the shroud, wherein the ferrule is accessible within the first end of the shroud.

37. The hardened connector of claim 36, the at least one opening defining a pair of openings disposed on opposites sides of the shroud.

38. The hardened connector of claim 25, wherein the shroud has at least one alignment indicia for indicating a mating orientation.

39. The hardened connector of claim 25, wherein the shroud includes a first finger and a second finger for mating, wherein the first finger and the second finger have different cross-sectional shapes for keying the hardened connector.

40. The hardened connector of claim 25, further comprising a protective cap.

41. The hardened connector of claim 25 being attached to a fiber optic cable, the cable further including a first strength component and a second strength component.

42. The hardened connector of claim 25, further comprising a pre-assembly of components.

43. A hardened connector, comprising:
an inner housing comprising at least two shells, the at least two shells having a longitudinal passageway for passing at least one optical waveguide therethrough, at least one cable clamping portion, and a connector assembly receiving portion, and the connector assembly receiving portion comprises an extended length cavity, wherein a portion of the at least two shells comprises a bow zone comprising a bow geometry that projects toward a longitudinal axis A-A of the inner housing;
a mechanical splice connector assembly, the mechanical splice connector assembly comprises a connector body and a ferrule assembly having a stub optical fiber secured to a ferrule, one or more splice parts disposed in a ferrule holder and a cam, wherein a portion of the mechanical splice connector assembly is configured for securing to the inner housing so that the ferrule assembly of the mechanical splice connector assembly fits within the extended length cavity only with the cam orientated in a clamping orientation and the ferrule assembly can move rearward into the extended length cavity when displaced rearward when assembled; and
a shroud, wherein a portion of the at least two shells is disposed within the shroud;
a cable sealing element and a pusher for deforming the cable sealing element against an end of the shroud; and
a rear nut for coupling to the end of the shroud such that the pusher and the cable sealing element are positioned between the rear nut and the shroud when assembled.

44. The hardened connector of claim 43, further comprising a snap ring disposed on a portion of the shroud.

45. The hardened connector of claim 43, further comprising a pre-assembly of components.

46. The hardened connector of claim 1, wherein:
the end of the shroud has a chambered portion for receiving the cable sealing element;
the pusher comprises a protrusion portion for extending into the chambered portion of the shroud;
the end of the shroud has a threaded portion for engaging an internal threaded portion of the rear nut; and
tightening of the rear nut on the end of the shroud deforms the cable sealing element between the protrusion portion of the pusher and the chambered portion of the shroud.

47. The hardened connector of claim 25, wherein:
the end of the shroud has a chambered portion for receiving the cable sealing element;
the pusher comprises a protrusion portion for extending into the chambered portion of the shroud;
the end of the shroud has a threaded portion for engaging an internal threaded portion of the rear nut; and
tightening of the rear nut on the end of the shroud deforms the cable sealing element between the protrusion portion of the pusher and the chambered portion of the shroud.

48. The hardened connector of claim 43, wherein:
the end of the shroud has a chambered portion for receiving the cable sealing element;
the pusher comprises a protrusion portion for extending into the chambered portion of the shroud;
the end of the shroud has a threaded portion for engaging an internal threaded portion of the rear nut; and
tightening of the rear nut on the end of the shroud deforms the cable sealing element between the protrusion portion of the pusher and the chambered portion of the shroud.

* * * * *

UNITED STATES PATENT AND TRADEMARK OFFICE
CERTIFICATE OF CORRECTION

| | | |
|---|---|---|
| PATENT NO. | : 10,782,485 B2 | Page 1 of 1 |
| APPLICATION NO. | : 16/211977 | |
| DATED | : September 22, 2020 | |
| INVENTOR(S) | : Michael de Jong et al. | |

It is certified that error appears in the above-identified patent and that said Letters Patent is hereby corrected as shown below:

In Column 18, Line 32 (approx.), Claim 9, delete "the shroud and" and insert -- wherein --, therefor.

In Column 18, Lines 44-45, Claim 12, delete "further-comprising" and insert -- further comprising --, therefor.

Signed and Sealed this
Twenty-second Day of December, 2020

Andrei Iancu
*Director of the United States Patent and Trademark Office*